(12) United States Patent
Katou et al.

(10) Patent No.: US 7,505,646 B2
(45) Date of Patent: Mar. 17, 2009

(54) OPTICAL SWITCH AND OPTICAL SWITCH ARRAY

(75) Inventors: Yukio Katou, Odawara (JP); Masaya Horino, Ishioka (JP); Masatoshi Kanamaru, Miho (JP); Yasuhiro Hamaguchi, Kumagaya (JP); Hiroyuki Nagatomo, Shimotsuke (JP)

(73) Assignee: Hitachi Metals, Ltd., Tokyo (JP)

( * ) Notice: Subject to any disclaimer, the term of this patent is extended or adjusted under 35 U.S.C. 154(b) by 238 days.

(21) Appl. No.: 11/393,784

(22) Filed: Mar. 31, 2006

(65) Prior Publication Data

US 2006/0219879 A1    Oct. 5, 2006

(30) Foreign Application Priority Data

Mar. 31, 2005  (JP) ............................. 2005-100878
Jan. 27, 2006  (JP) ............................. 2006-019074

(51) Int. Cl.
*G02B 6/00*        (2006.01)

(52) U.S. Cl. ....................................................... 385/18
(58) Field of Classification Search .................... 385/18
See application file for complete search history.

(56) References Cited

U.S. PATENT DOCUMENTS 6,657,770 B2 * 12/2003 Marom et al. ............... 359/290

7,016,098 B2 * 3/2006 Giles et al. .................. 359/290

FOREIGN PATENT DOCUMENTS

JP        2001-154124        6/2001
JP        2001-174724        6/2001

* cited by examiner

*Primary Examiner*—Uyen Chau N Le
*Assistant Examiner*—Hoang Tran
(74) *Attorney, Agent, or Firm*—Antonelli, Terry, Stout & Kraus, LLP.

(57) ABSTRACT

An optical switch includes an input optical fiber, first and second output optical fibers, a movable mirror for switching over an optical path between the input optical fiber and an output optical fiber, and collimator lenses disposed on optical paths formed between the input optical fiber and the output optical fibers. When drive force is applied, the movable mirror assumes a first or second position to form an optical path between the input optical fiber and the first or second output optical fiber. When drive force is not applied to the movable mirror, an optical path is formed between the optical path in the first position and that in the second position. In the first position, a first part of the movable mirror comes in contact with a substrate. In the second position, a part of the movable mirror different from the first part comes in contact with the substrate.

14 Claims, 12 Drawing Sheets

OPTICAL SWITCH AND OPTICAL SWITCH ARRAY

BACKGROUND OF THE INVENTION

The present invention relates to an optical switch for switching over connection of an optical signal transmitted through a plurality of optical fibers. In particular, the present invention relates to an optical switch for switching over the direction of the collimated optical signal by using a mirror.

Until now, a large number of optical switches have been proposed.

As a mechanical optical switch, an optical switch of optical fiber drive type having a structure which directly drives a magnetic film added to an input optical fiber by using a magnetic coil and which switches over one output optical fiber to another output optical fiber is proposed (see JP-A-2001-154124, pages 4 to 5 and FIGS. 1 to 3).

With the object of implementing a large scale optical switch, an optical switch according to an optical cross connect technique of three-dimensional free space type utilizing the MEMS (Micro Electro Mechanical System) technique is proposed (for example, see JP-A-2001-174724, pages 3 to 4 and FIG. 2). The optical switch of the three-dimensional free space type includes optical fibers, collimator lenses and mirror arrays.

FIG. 12 is an oblique view showing an example of a structure of a conventional optical switch. A light beam 103 formed by being passed through an input side optical fiber 101 and an input side collimator lens 102 is reflected by an input side mirror array 104, reflected again by an output side mirror array 105 opposed to the input side mirror array 104, passed through an output side collimator lens 106, and input to an output side optical fiber 107.

The light beam 103 is switched by changing positions of mirror devices 108 provided in the input side mirror array 104 and the output side mirror array 105 and causing reflection.

FIG. 13A is an X-Y plane view showing a structure of the mirror device 108 shown in FIG. 12. FIG. 13B is an X-Z sectional view showing the structure of the mirror device 108. The mirror device 108 has a structure in which a movable mirror 109 which reflects light into midair and which inclines is supported by a plurality of beams so as to be able to swing.

Various methods for inclining the movable mirror 109 have been contrived. Inclination caused by electrostatic force is used most frequently. In that case, electrodes 112 are formed on the movable mirror 109, and a plurality of electrodes 111 are formed in positions nearly opposed to the electrodes 112.

The movable mirror 109 includes an inner mirror 109a and an outer mirror 109b. The inner mirror 109a is coupled to the outer mirror 109b by a pair of beams 110. The outer mirror 109 is coupled to a substrate by a pair of beams 110.

Surfaces of the inner mirror 109a and the outer mirror 109b are coated with reflecting films 113 for reflecting a light beam. In general, gold, which has a high reflectance, is used as the reflecting films 113. Electrostatic drive electrodes 112 are formed on opposite faces of both the inner mirror 109a and the outer mirror 109b from the reflecting films.

Four separate electrodes 111 are formed in positions nearly opposed to the electrodes 112 in order to incline each of the inner mirror 109a and the outer mirror 109b in two directions. A voltage is applied between the electrodes 111 and the electrodes 112 to twist the beams 110 by using the electrostatic force, incline the movable mirror 109, and maintain a predetermined position.

SUMMARY OF THE INVENTION

As the communication networks expand recently, system simplification, cost reduction, power consumption reduction and transmission rate increase are demanded. In particular, instances which need a large number of optical switches each having a small channel such as a 1×2 channel are increasing.

The optical switch disclosed in JP-A-2001-154124 has no problem in the function of the single substance. However, mass blanket formation and size reduction are difficult.

A multi-channel optical switch disclosed in JP-A-2001-174724 is suitable for the mass blanket forming. However, optical path forming is executed by using mirror angle control. Therefore, a sophisticated control mechanism, specifically a mirror angle drift compensation mechanism and a mechanism for controlling for supplying drive force at the time of switching of the angle are needed. Furthermore, since the mirrors are held in the state in which they are floating in the midair, optical characteristics are apt to vary due to disturbance such as vibration, shock or drive force fluctuation. This results in a problem that the size is made large due to increase of the number of parts and the cost is increased due to a complicated and sophisticated control circuit.

An object of the present invention is to provide highly reliable small-sized optical switches that can be formed as a large-scale optical switch array.

In order to achieve the object, the present invention provides an optical switch including an optical fiber array formed by arranging one input optical fiber, a first output optical fiber and a second output optical fiber; a rotatable movable mirror for switching over optical paths between the input optical fiber and the output optical fibers; and a collimator lens array having three collimator lenses respectively corresponding to the input optical fiber and the two output optical fibers, the collimator lens array being disposed between the optical fiber array and the movable mirror, wherein the input optical fiber and the output optical fibers are aligned and arranged on substantially the same plane in order of the input optical fiber, the first output optical fiber and the second output optical fiber, the movable mirror has a first position for forming an optical path between the input optical fiber and the first output optical fiber, and a second position for forming an optical path between the input optical fiber and the second output optical fiber, the first position and the second position are formed by applying drive force to the movable mirror, when drive force is not applied to the movable mirror, an optical path is formed between the optical path formed in the first position and the optical path formed in the second position, the movable mirror is connected to a stationary member via elastic members formed integrally with the movable mirror, the first position is assumed by the movable mirror in contact with a substrate disposed so as to be opposed to the movable mirror, at a plurality of contact portions, and the second position is assumed by the movable mirror in contact with the substrate at a plurality of contact portions differing in at least a part from the contact portions forming the first position. Owing to such a configuration, the inclination angle of the mirror can be made small. In addition, the size of the optical switch can be made small and the reliability of the optical switch can be raised.

It is desirable to conduct switching between the first position and the second position via a non-contact state between the substrate and the movable mirror. Such a configuration further raised the reliability of the optical switch.

It is desirable to cause at least a part of the contact portions between the movable mirror and the substrate to be a projection provided on a rear face of the movable mirror. Such a configuration simplifies the structure of the optical switch and raises the reliability of the optical switch.

It is also possible to cause at least a part of the contact portions between the movable mirror and the substrate to be a projection provided on the substrate.

At least a part of the contact portions may be edges located on both sides of the movable mirror having a rotation axis of the movable mirror between, and notches may be provided on the edges. By adopting such a structure, the movable mirror can be prevented from sticking to the substrate.

If a cylindrical lens is disposed between the collimator lenses and the movable mirror, then further effects can be anticipated. According to this configuration, it becomes possible to align optical fibers in parallel. Such configuration is suitable for implementation of a smaller-sized optical switch, and provides efficient assembly work. Furthermore, since optical tolerance is expanded, the assembly can be further simplified.

An optical switch array may be obtained by integrating at least two optical switches, wherein the at least two optical switches are arranged and integrated in a column axis direction of the cylindrical lens, and the at least two optical switches share the one cylindrical lens.

The expression "at least two optical switches share the one cylindrical lens" means that the lens functions for at least two optical switches are fulfilled by one cylindrical lens. Since a plurality of optical switches share one cylindrical lens, the optical switch array can be reduced in size and highly integrated.

As each of the optical switches used in the optical switch array, a configuration other than that of the above-described optical switch can also be adopted. The optical switch array may be formed by using optical switches each including an optical fiber array having at least one input optical fiber and at least one output optical fiber arranged on substantially the same plane, a collimator lens array having collimator lenses respectively associated with the input optical fiber and the output optical fiber, a movable mirror for switching over an optical path between the input optical fiber and the output optical fiber, and a cylindrical lens disposed between the collimator lenses and the movable mirror. For example, an on-off type optical switch having one input optical fiber and one output optical fiber may also be used as the optical switch, or a 1×2 type optical switch having one input optical fiber and two output optical fibers may also be used as the optical switch.

According to the present invention, it is possible to provide highly reliable small-sized optical switches that can be formed as a large-scale optical switch array.

Other objects, features and advantages of the invention will become apparent from the following description of the embodiments of the invention taken in conjunction with the accompanying drawings.

DESCRIPTION OF THE EMBODIMENTS

Embodiments of an optical switch according to the present invention will now be described with reference to FIGS. 1 to 11.

First Embodiment

Figure 1A:
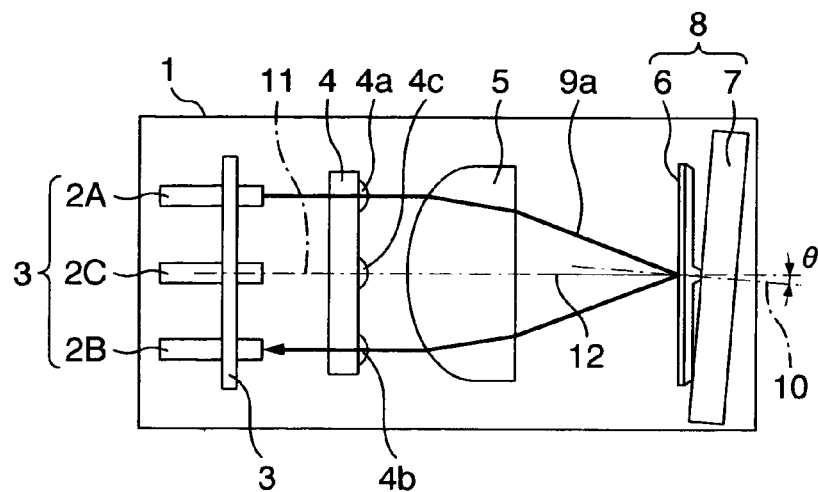
FIG. 1A is a diagram showing an optical path forming state from an input optical fiber to a second output optical fiber in an embodiment of the present invention.
Figure 1B:
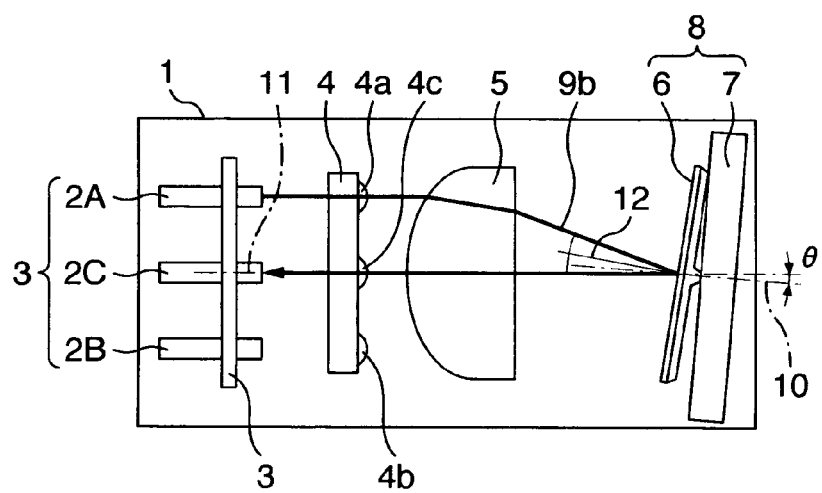
FIG. 1B is a diagram showing an optical path forming state from an input optical fiber to a first output optical fiber.

FIG. 1A is a diagram showing an optical path switching state from an input optical fiber 2A to an output optical fiber 2B in a first embodiment of an optical switch according to the present invention. FIG. 1B is a diagram showing an optical path switching state from an input optical fiber 2A to an output optical fiber 2C in the first embodiment.

An optical switch 1 in the first embodiment includes an optical fiber array 3 formed by arranging one input optical fiber 2A and two output optical fibers 2B and 2C, a collimator lens array 4 formed by arranging three collimator lenses 4a, 4b and 4c associated with the input optical fiber and the output optical fibers, a cylindrical lens 5, and a mirror device 8 including a movable mirror 6 and a substrate 7 as its components.

FIGS. 1A and 1B show a configuration having the cylindrical lens disposed between the collimator lenses and the movable mirror. A configuration in which the cylindrical lens is not disposed may also be used. In this case a predetermined angle should be given between the optical fibers.

Light emitted from the input optical fiber 2A and collimated by the collimator lens 4a associated with the input optical fiber is reflected by the movable mirror 6, and condensed by a collimator lens associated with the output optical fiber to arrive at the output optical fiber associated with the collimator lens.

The input optical fiber 2A, the first output optical fiber 2C and the second output optical fiber 2B are aligned and arranged on nearly the same plane in the order of the input optical fiber, the first output optical fiber and the second output optical fiber. These input and output optical fibers are aligned and arranged nearly on the same plane in order to couple the input optical fiber to an output optical fiber. The movable mirror 6 assumes a first position for forming an optical path between the input optical fiber 2A and the first output optical fiber 2C, and a second position for forming an optical path between the input optical fiber 2A and the second output optical fiber 2B. In other words, when the movable mirror 6 assumes the first position, light emitted from the input optical fiber 2A is reflected by the movable mirror 6 to arrive at the first output fiber 2C. When the movable mirror 6 assumes the second position, light emitted from the input optical fiber 2A is reflected by the movable mirror 6 to arrive at the second output fiber 2B.

If drive force is applied to the movable mirror, the first position or the second position is formed. In a state in which drive force is not applied to the movable mirror 6, an optical path is formed between the optical path formed in the first position and the optical path formed in the second position. In other words, in the configuration shown in FIGS. 1A and 1B, light emitted from the input optical fiber 2A and collimated by the collimator lens 4a associated with the input optical fiber is reflected by the movable mirror 6 and transmitted to a region between the collimator lens 4c associated with the first output fiber 2C and the collimator lens 4b associated with the second output fiber 2B as shown in FIG. 1C.

When the movable mirror 6 in the mirror device 8 switches the optical path between input and output ports, the optical signal reflected by the movable mirror 6 does not cross the ports of the adjacent input and output optical fibers. If such a configuration is adopted, therefore, the quality degradation of the optical signal passed through the input and output optical fibers can be suppressed. In other words, when switching the optical path, disturbance on the optical communication network caused by return of the optical signal reflected by the movable mirror 6 to the input optical fiber 2A can be avoided. In the state in which drive force is not applied to the movable mirror, light emitted from the input optical fiber is present between the collimator lens 4c associated with the first output optical fiber 2C and the collimator lens 4b associated with the second output optical fiber 2B. Therefore, the operation angle of the movable mirror 6 can be made small.

In the optical switch according to the present invention, it is desirable to dispose the cylindrical lens 5 between the collimator lens array 4 and the movable mirror 6. By using the cylindrical lens 5, it becomes possible to arrange the input and output optical fibers 2A, 2B and 2C in parallel, facilitating the optical switch assembling and contributing to the size reduction. Furthermore, the cylindrical lens 5 mitigates the allowance for the operation angle discrepancy of the movable mirror 6.

Figure 1C:
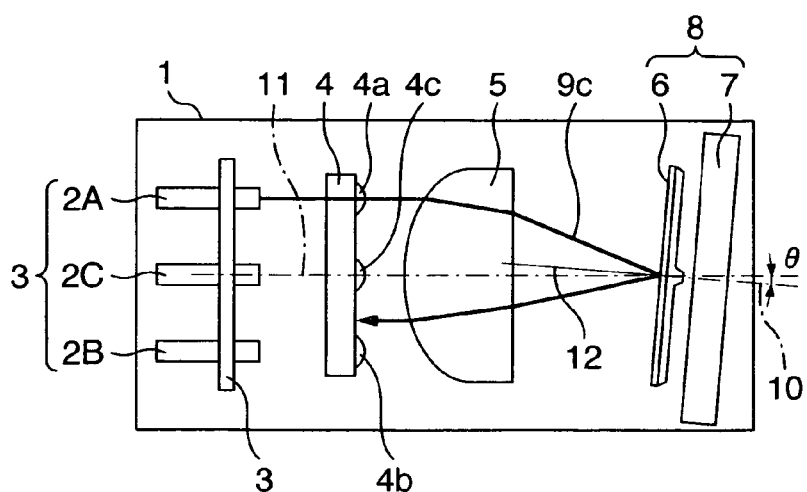
FIG. 1C is a diagram showing propagation of light emitted from an input optical fiber in a state in which drive force is not given to a movable mirror.

Hereafter, an example of an embodiment according to the present invention will be described with reference to the embodiment in which the cylindrical lens is disposed as shown in FIGS. 1A, 1B and 1C. As described above, FIG. 1B is a diagram showing the state in which the optical path is formed from the input optical fiber 2A to the first output optical fiber 2C in the optical switch according to the present invention. In FIG. 1B, the movable mirror 6 assumes the first position.

FIG. 1A is a diagram showing the state in which the optical path is formed from the input optical fiber 2A to the second output optical fiber 2B. In FIG. 1A, the movable mirror 6 assumes the second position.

FIG. 1C is a diagram showing propagation of light emitted from the input optical fiber 2A in the state in which drive force is not applied to the movable mirror 6.

Light emitted from the input optical fiber 2A and collimated by the collimator lens 4a associated with the input optical fiber is passed through the cylindrical lens 5, reflected by the movable mirror 6, passed through the cylindrical lens 5 again, and then collimated by a collimator lens associated with an output optical fiber to arrive at the output optical fiber associated with the collimator lens.

The input optical fiber 2A, the first output optical fiber 2C and the second output optical fiber 2B are aligned and arranged on nearly the same plane in the order of the input optical fiber, the first output optical fiber and the second output optical fiber, as described above. It is desirable that the input and output optical fibers 2A, 2B and 2C are arranged nearly in parallel. And it is desirable to cause the array pitch (arrangement interval) of the collimator lenses associated with the input and output optical fibers to coincide with the array pitch of the input and output optical fibers.

If the optical fiber array, the collimator lens array and the cylindrical lens are arranged symmetrically about the first output optical fiber 2C as shown in FIG. 1, the configuration of the optical switch can also be said in other words as follows. The components are arranged so as to cause an angle between a normal line 10 (neutral normal line 10) of the movable mirror 6 in the neutral state of the mirror device 8 and a central axis 11 passing through centers of the optical fiber array 3, the collimator lens array 4 and the cylindrical lens 5 in the neutral state of the mirror device 8 to become equal to a predetermined angle θ in the rotation direction of the movable mirror 6. Here, the neutral state is a state in which drive force is not applied to the movable mirror. In FIGS. 1A, 1B and 1C, the central axis direction coincides with the direction of the first output optical fiber 2C. The mirror device 8 has means capable of driving the movable mirror 6 so as to incline the movable mirror 6 at equal angles clockwise and counterclockwise about the angle in the neutral state. For example, the electrostatic drive technique can be applied to the movable mirror 6 and the substrate 7.

If design is conducted so as to be able to incline the movable mirror 6 by the predetermined angle θ with reference to the angle position in the neutral state in FIG. 1A, then a normal line 12 (a movable mirror normal line 12) of the movable mirror 6 and a central axis 11 in a state in which the movable mirror 6 is inclined by the predetermined angle θ are in parallel. As a result, light reflected by the surface (reflecting surface) of the movable mirror 6 is passed through the cylindrical lens 5 and the collimator lens 4b again, and coupled to the output optical fiber 2B. In FIG. 1B, the movable mirror 6 is inclined by the angle θ clockwise (in a direction opposite to that in FIG. 1A) with reference to the angle position in the neutral state.

As a result, light reflected by the surface (reflecting surface) of the movable mirror 6 is passed through the cylindrical lens 5 and the collimator lens 4c, and coupled to the output optical fiber 2C. In other words, it becomes possible to switch over the output optical fiber by switching over the movable mirror 6. Even in an arrangement in which the input optical fiber 2A is disposed in the position of the output optical fiber 2B, the output optical fiber 2B is disposed in the position of the input optical fiber 2A and the normal line 10 (neutral normal line 10) of the movable mirror 6 in the neutral state of the mirror device 8 is disposed so as to have the predetermined angle θ in the counterclockwise direction about the central axis 11, it becomes possible to switch over the optical fiber in the same way as the foregoing description.

The configuration in the first embodiment will be described in more detail. In FIGS. 1A, 1B and 1C, a first angle (θ1) implemented by the movable mirror in a first position and a second angle (θ2) implemented by the movable mirror in a second position about a state (neutral state) in which drive force is not applied to the movable mirror 6 have a relation θ1=−θ2=θ. However, the rotation quantity of the movable mirror 6 is not restricted to that in the present first embodiment. If the components (the optical fiber array 3, the collimator lens array 4, the mirror device 8 and the cylindrical lens 5) of the optical switch are arranged so as to cause light emitted from the input optical fiber 2A to arrive at the first output fiber 2C when the movable mirror 6 assumes the first position and cause light emitted from the input optical fiber 2A to arrive at the second output fiber 2B when the movable mirror 6 assumes the second position, then the relation θ1≠−θ2 may be satisfied.

Lens shapes of the collimator lenses 4a, 4b and 4c can be freely selected, as long as the collimator lenses 4a, 4b and 4c have a function of collimating light emitted from the input optical fiber 2A and condensing the collimated light to the output optical fiber 2B or 2C. For example, the collimator lenses 4a, 4b and 4c may be spherical lenses, aspherical lenses or Fresnel lenses. The collimator lenses 4a, 4b and 4c may be also convex lenses, concave lenses, or graded index lenses. In the present first embodiment, the collimator lens array 4 is arranged to have flat faces opposed to the optical fiber array 3 and convex lens faces opposed to the cylindrical lens 5. And the collimator lenses are arranged in the same array pitch as that of the optical fiber array 3.

As the material of the collimator lenses, a material that is not opaque at a wavelength of light in use, such as ordinary optical glass, silicon, quartz or resin, can be selected. In the present first embodiment, collimator lenses made of silicon are used. Furthermore, it is desirable to form an antireflection film accommodated to the wavelength of light in use, on the obverse and the reverse of each of the collimator lenses.

The shape of the cylindrical lens 5 can be freely selected, as long as the cylindrical lens 5 has a function of deflecting light emitted from the input optical fiber 2A and collimated by the associated collimator lens 4a to the movable mirror 6 and deflecting light reflected by the movable mirror 6 to the output optical fiber 2B or 2C. The cylindrical lens can be formed as a convex or a concave lens. Furthermore, the face of the cylindrical lens opposed to the optical fiber array 3 can be formed as a curved face or a flat face.

As the material of the cylindrical lens, a material that is not opaque at a wavelength of light in use, such as ordinary optical glass, silicon, quartz or resin, can be selected. In the present first embodiment, the cylindrical lens 5 is made of silica based glass. The predetermined angle θ depends on the radius of curvature and the focal distance of the lens face. In the present first embodiment, the radius of curvature and the focal distance of the cylindrical lens are determined supposing that the angle θ is 1°. Furthermore, it is desirable to form an antireflection film accommodated to the wavelength of light in use, on the obverse and the reverse of the cylindrical lens.

The mirror device 8 will now be described.

Figure 2A:
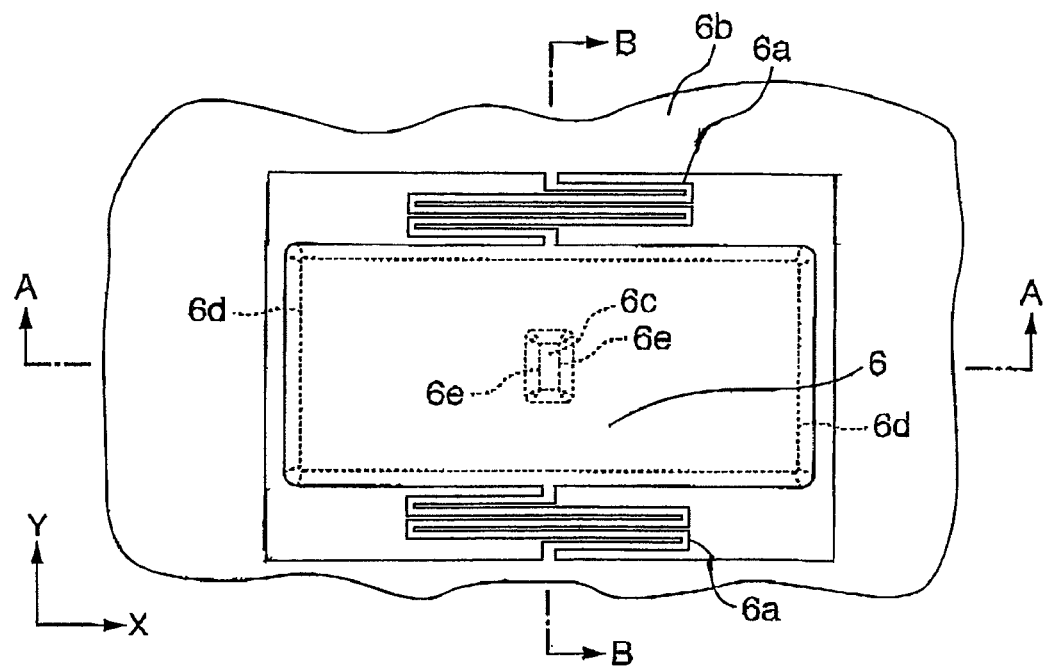
FIG. 2A is an X-Y plane view showing a structure of a reflecting surface side of a movable mirror in an embodiment of the present invention.
Figure 2B:
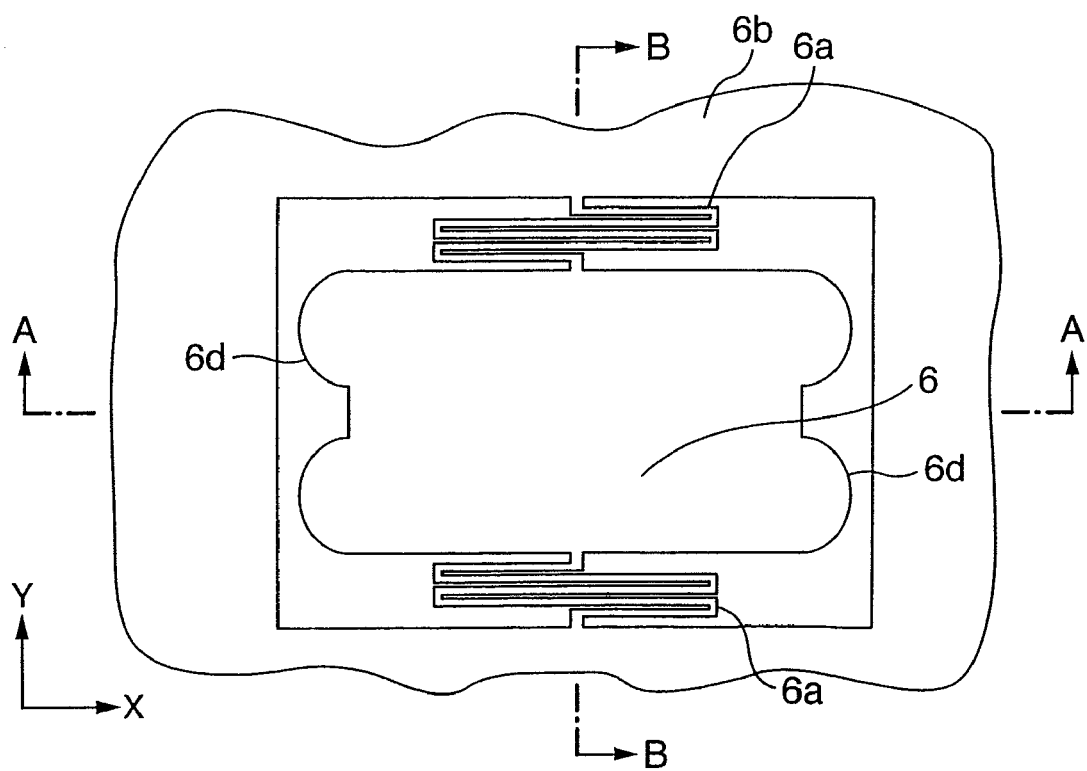
FIG. 2B is an X-Y plane view showing a structure of a rear face side of a movable mirror having another shape.
Figure 3A:
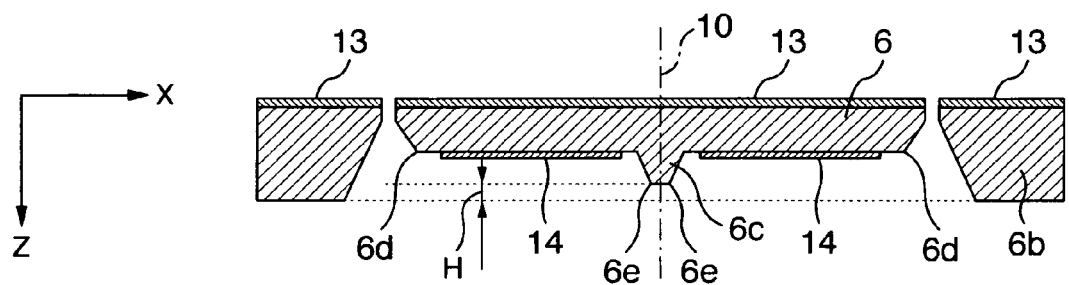
FIG. 3A is an X-Z sectional view showing a structure of a movable mirror taken along a line A-A shown in FIGS. 2A and 2B.
Figure 3B:
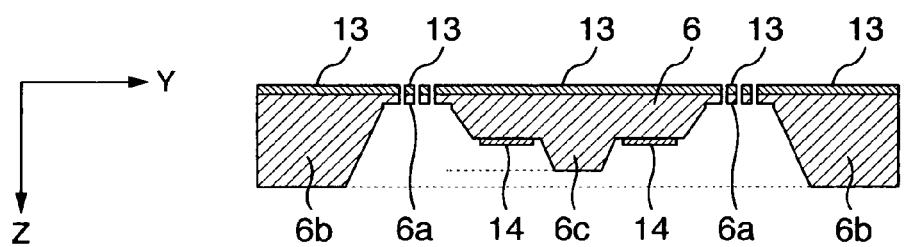
FIG. 3B is a Y-Z sectional view showing a structure of a movable mirror taken along a line B-B shown in FIGS. 2A and 2B.

FIG. 2A is an X-Y plane view showing a structure of the reflecting surface side of the movable mirror 6. FIG. 3A is an X-Z sectional view showing a structure of the movable mirror 6 taken along a line A-A shown in FIG. 2A. FIG. 3B is a Y-Z sectional view showing the structure of the movable mirror 6 taken along a line B-B shown in FIG. 2B. A dotted line in FIG. 2A represents a schematic shape of a rear face. Here, the rear face is a face of the movable mirror 6 opposed to the substrate 7.

The movable mirror 6 is connected to a movable mirror substrate 6b via elastic members 6a formed integrally with the movable mirror. In FIGS. 2A and 2B, a pair of beams corresponds to the elastic members 6a. The movable mirror 6 is supported by the pair of beams 6a. The beams 6a are coupled to the movable mirror substrate 6b. The shape of the elastic members is not restricted to that of the present embodiment. In the case of the present first embodiment, it is desirable to cause connection positions between the beams 6a and the movable mirror 6 to nearly coincide with the central axis of the mirror in order to support the movable mirror 6 stably. On the other hand, if the beams 6a are symmetric about the central point of the movable mirror 6, then it is possible that the movable mirror 6 deviates from the axis in operation when the movable mirror 6 conducts a rotary movement about an axis between connection nodes of the movable mirror 6 and the beams 6a. Therefore, in order to avoid such deviation, it is desirable that the beams 6a are line-symmetrical about the line A-A.

As for the beams 6a, meander beams extending in the X-axis direction and having a folded structure are used so as to facilitate the rotational operation and the translational movement in the Z-direction, i.e., sinking of the movable mirror 6.

In the present first embodiment, a projection 6c is formed near the center of the rear face. The shape of the projection 6c is a trapezoid having short sides in the Z-direction. However, the position of the projection is not restricted to the center of the rear face. The shape of the projection 6c is not restricted to the trapezoid having short sides in the Z-direction.

The movable mirror 6 maintains its position stably at two angles, i.e., at a first angle implemented in a first position and a second angle implemented in a second position. It does not matter what relation is present between the first angle and the second angle. From the viewpoint of simplifying the manufacturing process, it is more desirable to make the first angle equal in magnitude to the second angle as in the examples shown in FIGS. 1A, 1B and 1C described above. When the movable mirror 6 assumes the first position, light emitted from the input optical fiber 2A arrives at the first output fiber 2C. When the movable mirror 6 assumes the second position, light emitted from the input optical fiber 2A arrives at the second output fiber 2B.

The first position is formed by contact of the movable mirror in a plurality of contact portions with the substrate disposed so as to be opposed to the movable mirror. FIG. 1B shows a state in which the movable mirror 6 assumes the first position. In the first position exemplified in FIG. 1B, the projection 6c formed on the rear face of the movable mirror 6 is in contact with the substrate 7 and an end of the movable mirror 6 is in contact with the substrate 7, and consequently an operating range of the movable mirror 6 is restricted mechanically. As a result, the position of the movable mirror 6 assuming the first position has resistance against disturbance such as vibration, shock or fluctuation of drive force from an actuator.

The second position is formed by contact of the movable mirror with the substrate disposed so as to be opposed to the movable mirror, in a plurality of contact portions that differ in at least a part from the contact portions forming the first position. FIG. 1A shows a state in which the movable mirror 6 assumes the second position. In the second position exemplified in FIG. 1A, the projection 6*c* formed on the rear face of the movable mirror 6 is in contact with the substrate 7 and another end of the movable mirror 6 is in contact with the substrate 7, and consequently an operating range of the movable mirror 6 is restricted mechanically. As a result, the position of the movable mirror 6 assuming the second position has resistance against disturbance such as position vibration of the movable mirror 6, shock or fluctuation of drive force from an actuator. In the configuration, the projection 6*c* is used as the contact portion in both the first and second positions. In the first position and the second position, one end and the other end of the movable mirror are used as the contact portion, respectively.

It is desirable that the movable mirror 6 assumes a third position during transition of switching between the first position and the second position. In the third position, the movable mirror 6 is supported by only the elastic members, i.e., the beams 6*a* and consequently the movable mirror 6 does not have a contact point to the substrate 7. In this case, switching between the first position and the second position is conducted via the non-contact state between the substrate and the movable mirror.

FIG. 1C shows a state in which the movable mirror 6 assumes the third position. In the third position, the movable mirror 6 is supported by only the elastic members, i.e., the beams 6*a* and consequently the movable mirror 6 does not have a contact portion to the substrate 7. Since the movable mirror 6 assumes the third position during transition of switching between the first position and the second position, friction between the movable mirror 6 and the substrate 7 is reduced and consequently excellent resistance against friction of the contact point between the movable mirror 6 and the substrate 7 is obtained. The friction of the contact point between the movable mirror 6 and the substrate 7 affects the first angle and the second angle of the movable mirror 6. Since the first angle and the second angle of the movable mirror 6 affect a loss on an optical path formed between the input optical fiber and the output optical fiber, increasing the resistance against the wear of the contact point between the movable mirror 6 and the substrate 7 stabilizes the loss characteristics of the optical switch. A configuration in which switching between the first position and the second position is conducted via the non-contact state between the substrate and the movable mirror can be applied not only to this configuration of the input and output optical fibers but also to other configurations of the input and output optical fibers. Such a configuration can be applied to, for example, the case where two output fibers are arranged with an input optical fiber between, or widely the case where at least one input optical fiber and at least one output optical fiber are coupled to each other.

The movable mirror 6 conducts the sinking operation while conducting the rotation operation by applying one or more of various actuators such as an electrostatic actuator, an electromagnetic actuator, a piezoelectric actuator and a thermal actuator. The sinking operation is a translational movement such that the movable mirror is attracted to the substrate. For example, if the electrostatic actuator is used, the substrate 7 is provided with electrodes associated with both rotational directions of the movable mirror 6, and a potential difference is given between at least one of the electrodes and the movable mirror 6, then not only force for rotating the movable mirror 6 but also force for sinking the movable mirror 6 is generated, and consequently the movable mirror 6 sinks while it is rotating. The degree of generation of the rotation and sinking can be adjusted by changing the rigidity of the elastic members 6*a* which support the mirror. In the ensuing description, the electrostatic actuator is taken as an example.

Figure 7:
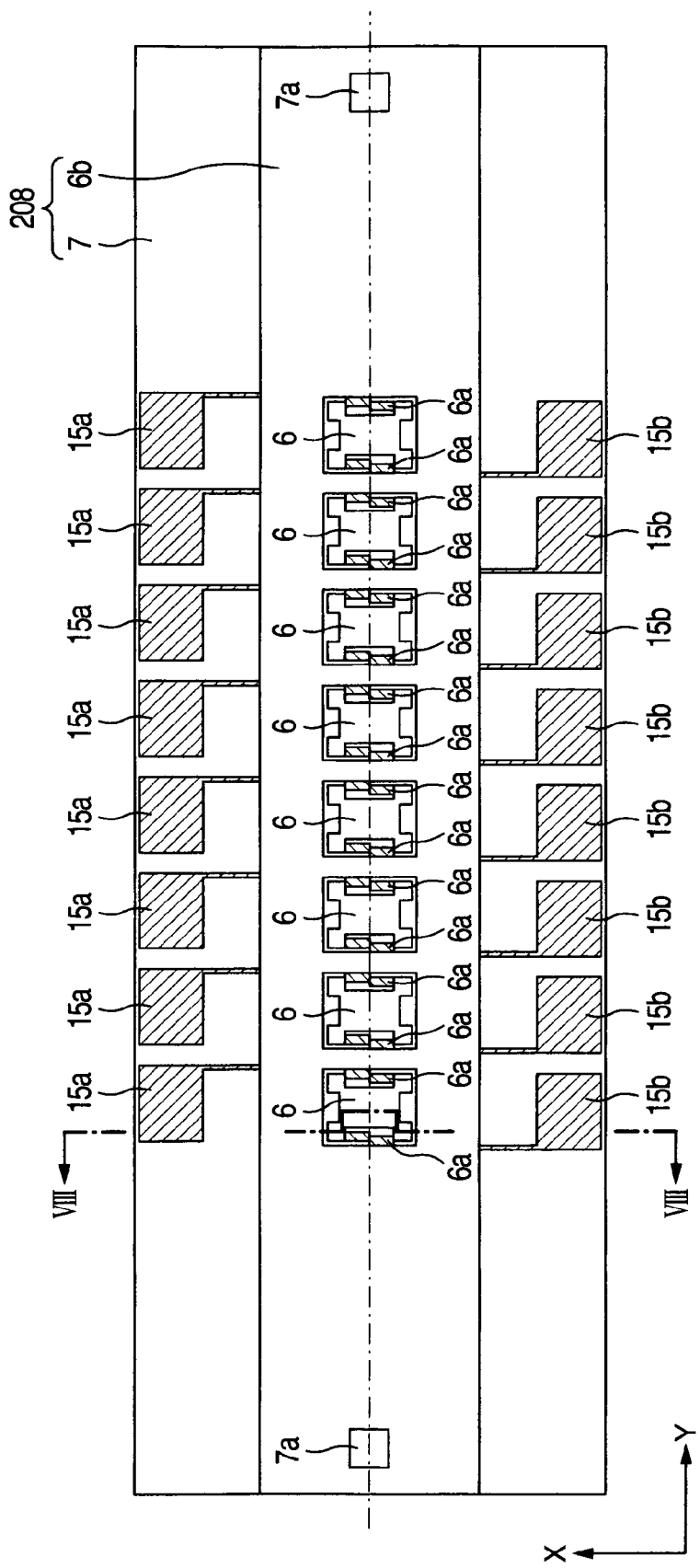
FIG. 7 is an X-Y plane view showing a structure of a reflecting surface side of a movable mirror in a second embodiment.

The shape of the movable mirror 6 is not restricted to a rectangle having a long side in the X-direction as shown in FIGS. 2A and 2B. The shape of the movable mirror 6 may be a rectangle having a short side in the X-direction, a square, a circle, an ellipse, a polygon, an H-shape, an X-shape, or a combination of them. For avoiding adhesion between the mirror and the substrate while stabilizing the first position and the second position of the movable mirror, it is desirable to bring end sides on both sides of the movable mirror 6 having the rotation axis of the movable mirror between into contact with the substrate 7 and provide a notch on each end side. There are no special restrictions in the number, shape and size of the notches. A rectangular notch may be provided in the center of each of end sides to form an X-shape as shown in FIG. 7. It is also possible to maximize the length of the notches as shown in FIG. 2B and adopt a shape in which contact is made at two or more contact points.

Hereafter, an example of a more detailed manufacturing method of the movable mirror 6 in the present first embodiment will be described. However, the manufacturing method of the movable mirror 6 is not restricted to a manufacturing method described later.

The movable mirror 6, the beams 6*a* and the movable mirror substrate 6*b* can be formed in a series of processes by using single crystalline silicon.

As for the material for forming the movable mirror 6, the beams 6*a* and the movable mirror substrate 6*b*, a wafer formed by joining three layers of polycrystalline silicon, silicon oxide and silicon so as to have the silicon oxide layer interposed inside may be used instead of monocrystalline silicon. Each of the movable mirror 6, the beams 6*a* and the movable mirror substrate 6*b* is fabricated according to a method suitable for the material.

Hereafter, the manufacturing method of the movable mirror 6, the beams 6*a* and the movable mirror substrate 6*b* using the monocrystalline silicon substrate will be described.

First, the external shape of the movable mirror 6 and the projection 6*c* having the trapezoidal shape are formed by repeating mask formation using photolithography and wet etching processing on one side of a monocrystalline silicon substrate having a plane orientation (100) a plurality of times. Ridgelines of the projection 6*c* or parts of them are referred to as pivot edges 6*e*. A predetermined gap H is provided between the projection 6*c* and a bottom face of the movable mirror substrate 6*b*. As a result, the movable mirror 6 can assume the third position more easily during transition of switching from the first position to the second position.

The beams 6*a* are formed by working upon the movable mirror substrate 6*b* from a face opposite to the face having the projection 6*c* formed thereon so as to become thin. For example, dry etching is used for working upon to form the beams 6*a*. According to this method, the beams 6*a* can be formed so as to become thin.

Sticking of the movable mirror 6 with the substrate 7 and the shock at the time of collision can be mitigated by trimming the mirror edges 6*d* of the movable mirror 6 and pivot edges 6*e* of the projection 6*c* using dry etching and providing them with curvature. Or a projection having a shape provided with curvature originally can also be fabricated instead of trimming the trapezoidal projection and providing the projection with curvature. The projection can be implemented by, for example, conducting dry etching on a member protected by a photomask having a semispherical sectional shape.

A reflecting film 13 for reflecting light is formed on the reflecting surface of the movable mirror 6. The reflecting film 13 should have a high reflectance with respect to the wavelength of light in use. For example, gold and aluminum or various multi-layer films should be formed using means such as sputtering or evaporation. In the present first embodiment, the reflecting film 13 is formed by sputtering of gold.

In addition, an electrostatic drive electrode 14 is formed on at least a part of the rear face of the movable mirror 6. The electrostatic drive electrode 14 should be formed of a high conductivity material. For example, the electrostatic drive electrode 14 can be implemented by forming a single layer or multi-layer film of gold, aluminum or other metal by using means such as sputtering or evaporation. Furthermore, it is also possible to form the movable mirror 6 of a material having a high conductivity (such as silicon raised in conductivity) and thereby cause the material forming the movable mirror 6 to have the function of the electrostatic drive electrode 14. In the present first embodiment, the electrostatic drive electrode 14 is formed by sputtering gold.

The reflecting film 13 and the electrostatic drive electrode 14 of the movable mirror 6 may have conduction between them, or may be insulated from each other. Furthermore, the tip of the projection 6*c* is previously coated with a resist to prevent an electrode from being formed. In order to simplify the process, however, an electrode may be formed on the tip of the projection 6*c* without coating the tip of the projection 6*c* with a resist.

Figure 4A:
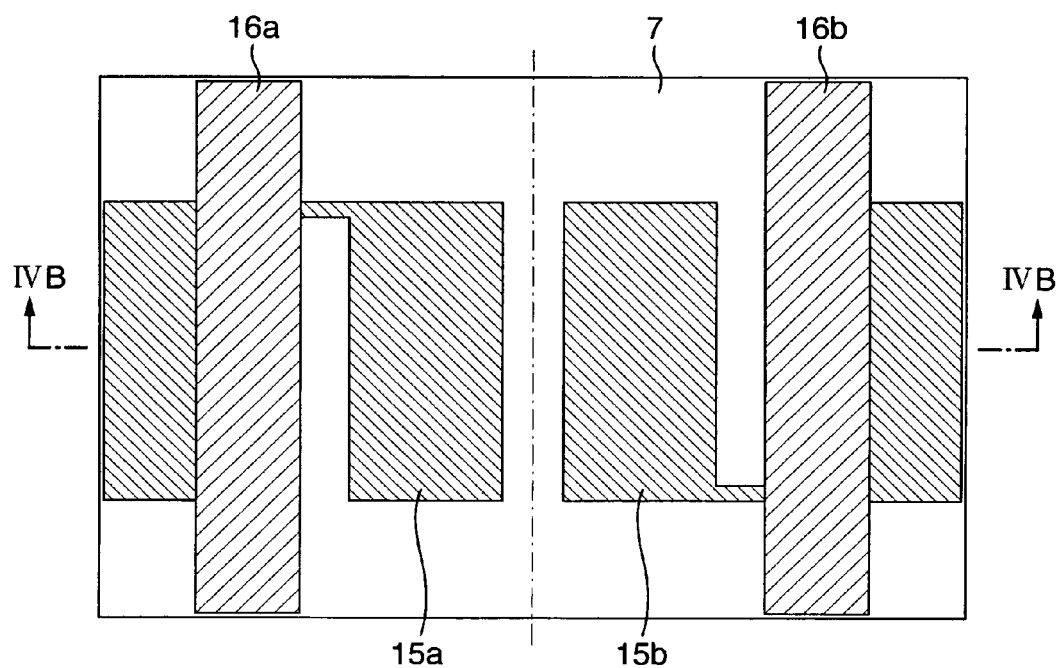
FIG. 4A is a plan view showing an example of a structure of a substrate in a first embodiment of the present invention.
Figure 4B:
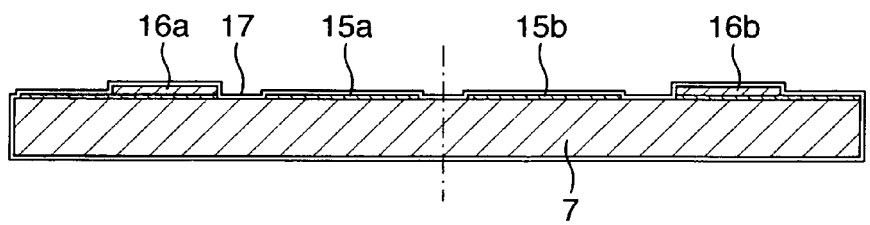
FIG. 4B is a sectional view showing an example of a structure of a substrate taken along a line IVB-IVB shown in FIG. 4A.

FIG. 4A is a plane view showing an example of a structure of the substrate 7 in the first embodiment. FIG. 4B is a sectional view showing a structure of the substrate 7 taken along a line IVB-IVB in FIG. 4A.

An electrode 15*a* and an electrode 15*b* for supplying drive force to switch over the movable mirror 6 between the first position and the second position are formed on the substrate 7. The electrode 15*a* and the electrode 15*b* formed on the substrate 7 are electrically insulated from each other. The electrode 15*a* and the electrode 15*b* can be implemented by, for example, partially forming a conductive film of gold or the like on a silicon substrate coated with silicon oxide at its surface, by using a technique such as sputtering or evaporation.

The movable mirror 6, the electrode 15*a* and the electrode 15*b* are electrically insulated from each other in the first position and the second position. As a method for electrically insulating the movable mirror 6, the electrode 15*a* and the electrode 15*b* from each other, a method of forming an insulation film 16*a* on the electrode 15*a* and forming an insulation film 16*b* on the electrode 15*b* may be used. The insulation films 16*a* and 16*b* can be implemented by forming a SiO$_2$ film having a thickness of approximately 100 nm using, for example, sputtering.

The movable mirror 6, the electrode 15*a* and the electrode 15*b* can be electrically insulated from each other by setting dimensions and position relations so as to prevent the movable mirror 6, the electrode 15*a* and the electrode 15*b* from coming in contact in the first and second positions.

It is desirable to coat the surface of the substrate 7 with a low surface energy material. For example, a fluorine thin film 17 can be applied as a low surface energy coating material. In the present first embodiment, the surface is coated with perfluoropolyether (PFPE) by a thickness in the range of 2 to 3 nm using the spin coating method.

As another fluorine thin film, polytetrafluoroethylene (PTFE), perfluoroalkoxylalkane (PFA), or perfluoroethylenepropylene (PEP) which is a crystalline fluorine resin, or an amorphous fluorine resin may also be used.

The movable mirror substrate 6*b* is put on and joined to the substrate 7 to form the mirror device 8.

In the present first embodiment, it is possible to rotate the movable mirror 6 and cause the movable mirror 6 to assume the first position and the second position by applying either the electrode 15*a* or the electrode 15*b*.

Figure 5A:
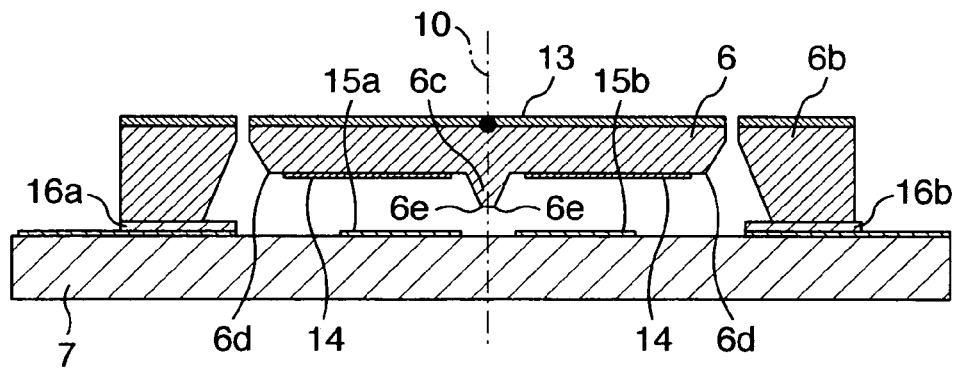
FIG. 5A is a sectional view showing a structure of a mirror device in a state in which drive force is not given in an optical switch in a first embodiment of the present invention.
Figure 5B:
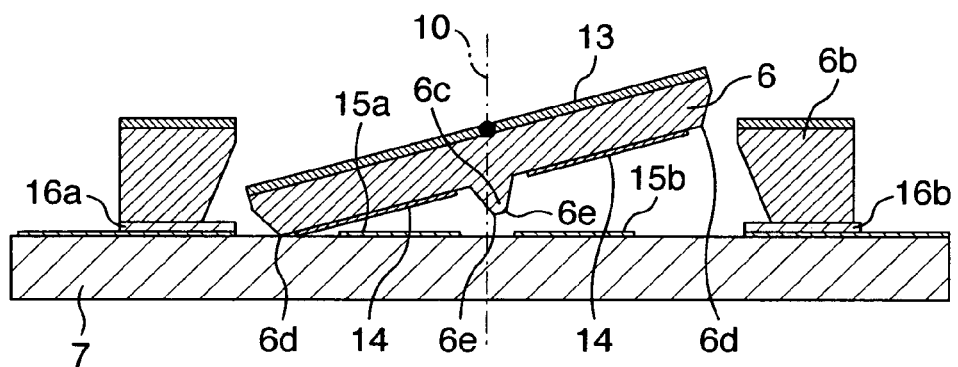
FIG. 5B is a sectional view in a state in which a mirror edge of a movable mirror of a mirror device is in contact with a substrate.
Figure 5C:
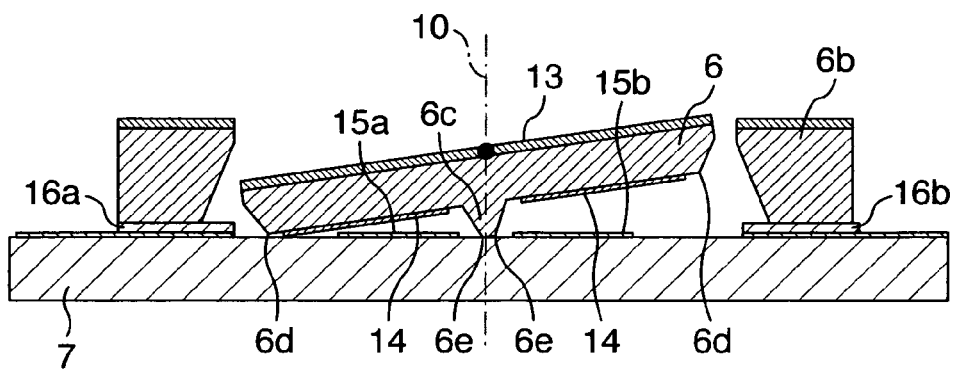
FIG. 5C is a sectional view in a state in which a mirror edge and a pivot edge of a movable mirror of a mirror device is in contact with a substrate.

FIG. 5A is a sectional view showing the structure of the mirror device 8 in the first embodiment in a state in which the drive force is not supplied, i.e., the voltage is not applied. FIG. 5B is a sectional view in a state in which only a mirror edge 6*d* of the mirror device 8 is in contact with the substrate 7. FIG. 5C is a sectional view in a state in which the mirror edge 6*d* and the pivot edge 6*e* of the mirror device 8 are in contact with the substrate 7. Hereafter, an example of the movement of the movable mirror in the case where a voltage is applied will be described.

First, the electrode 14 is set equal to 0 V. Subsequently, a voltage is applied to either the electrode 15*a* or the electrode 15*b* (it is now assumed that a voltage is applied to the electrode 15*a*). As a result, the movable mirror 6 is inclined by electrostatic attraction with the center of the meander beam, i.e., the rotation axis given by the meander beam serving as the rotation center.

At a certain voltage, pull-in in the rotation direction is caused and a mirror edge 6*d* is in contact with the substrate 7. As for the electrode 14 of the mirror and the electrode 15*a* of the substrate 7, design is conducted so as to prevent the electrode 14 and the electrode 15*a* from being in contact with each other even if a mirror edge 6*d* comes in contact with the substrate 7.

In addition, if the voltage is raised, the electrostatic attraction becomes stronger. With the mirror edge 6*d* kept in contact with the substrate 7, therefore, the movable mirror 6 is attracted in the Z-direction.

Finally, the pivot edge 6*e* (the left side in FIG. 5C) of the projection 6*c* comes in contact with the substrate 7. As a result, the movable mirror 6 is kept in a predetermined position (the first position). The applied voltage causing the predetermined position is referred to as Ve.

This predetermined position depends upon the height of the projection 6*c* and the distance between the mirror edge 6*d* and the pivot edge 6*e* in the X-axis direction.

For causing the movable mirror 6 to switch over light from the predetermined position, the voltage applied to the electrode 15*a* is lowered to 0 V and the same voltage Ve is applied to the other electrode 15*b*. By the way, the voltage need not necessarily be the same voltage as Ve, but may be a voltage that can implement a predetermined position (the second position).

Because of restoration force of spring of the meander beams displaced in the Z-direction, the pivot edge 6*e* of the movable mirror 6 leaves, and the mirror edge 6*d* leaves the electrode substrate.

The restoration force of the meander beams has not only a component in the Z-direction but also a rotation component. Apparently, the restoration force becomes large. As a result, the initial state shown in FIG. 5A in which the movable mirror 6 becomes parallel to the substrate 7 is restored.

The movable mirror 6 is rotated in the opposite direction by electrostatic force generated by the electrode 15b, displaced in the Z-direction, and kept in the predetermined position (the second position).

On the other hand, the movement of the movable mirror is not restricted to the above-described movement. The pivot edge 6e of the projection 6c may come in contact with the substrate earlier, or the pivot edge 6e and the mirror edge 6d may come in contact with the substrate simultaneously. For example, in the case where the pivot edge 6e and the mirror edge 6d come in contact with the substrate simultaneously, the following movement is conducted. A voltage is applied between the electrode 14 and either the electrode 15a or the electrode 15b (here the electrode 15a) as the drive force. As a result, the movable mirror 6 is inclined by electrostatic attraction with the beams 6a serving as the rotation center. At the same time, the movable mirror 6 sinks in the Z-direction.

If a sufficient potential difference is given between the electrode 14 and the electrode 15a, then the mirror edge 6d comes in contact with the substrate 7, the pivot edge 6e (the left side in FIG. 5C) of the projection 6c comes in contact with the substrate 7, and the movable mirror 6 assumes the first position.

In the transition of switching of the position of the movable mirror 6 between the first position and the second position, the potential difference between the electrode 14 and the electrode 15a or 15b is set equal to 0 V, and a voltage is applied to the other electrode 15b. By doing so, a third state in which the movable mirror 6 is supported only by the beams 6a and the movable mirror 6 does not have a contact point to the substrate 7 can be implemented in the process in which the potential difference between the electrode 14 and the electrode 15a or 15b is temporarily set equal to 0 V. For implementing the third state, however, it is not always necessary to set the potential difference between the electrode 14 and the electrode 15a or 15b equal to zero.

It is appreciated that the mirror is kept in the predetermined position in the series of operations provided that a voltage that is at least the voltage required to cause the pivot edge 6e to come in contact with the substrate 7 is applied. If a potential difference sufficient to keep the state in which the movable mirror 6 is in contact with the substrate 7 in a plurality of contact portions is applied between the electrode 14 and the electrode 15a or 15b, then the first position and the second position are maintained even when a voltage fluctuation occurs at the electrode 14 and the electrode 15a or 15b to some degree. In the optical switch 1 according to the present invention, therefore, simple digital drive is possible and a complicated control circuit is not required.

Furthermore, as compared with the drive technique of supporting the mirror by using only the beams in the state in which the mirror is floating in the air, it is not necessary to take the pull-in caused by a subtle change of the inclination into consideration.

Conversely, it is also possible to shorten the switching time by utilizing the pull-in actively. Furthermore, in the drive technique of supporting the mirror by using only the beams in the state in which the mirror is floating in the air, the drive force must be applied gently so as not to generate pull-in. On the other hand, in the present technique, it is not necessary to consider how to apply the drive force. In addition, drop of the switching rate is not generated by applying the drive force gently and waiting for the vibration of the movable mirror generated at the time of driving to damp. As the gap H between the projection 6c and the substrate 7 is made smaller, the period of time over which the projection 6c is in contact with the substrate 7 can also be shortened, resulting in a lowered voltage and a shortened switching time.

In addition, if the mirror edge 6d and the pivot edge 6e of the projection 6c come in contact with the substrate 7, then it is possible to damp the vibration of the movable mirror caused by a fluctuation of electrostatic force due to disturbance and suppress the generation of the angle fluctuation of the movable mirror.

Since a fluorine resin film 17 having low surface energy is formed in the contact portions, there is no fear that the mirror will be stuck because of adhesion of moisture caused by contact.

If the contact area is reduced and the surface energy is lowered as to the contact portions between the movable mirror 6 and the substrate 7, the sticking between the movable mirror 6 and the substrate 7 can be avoided.

Figure 8:
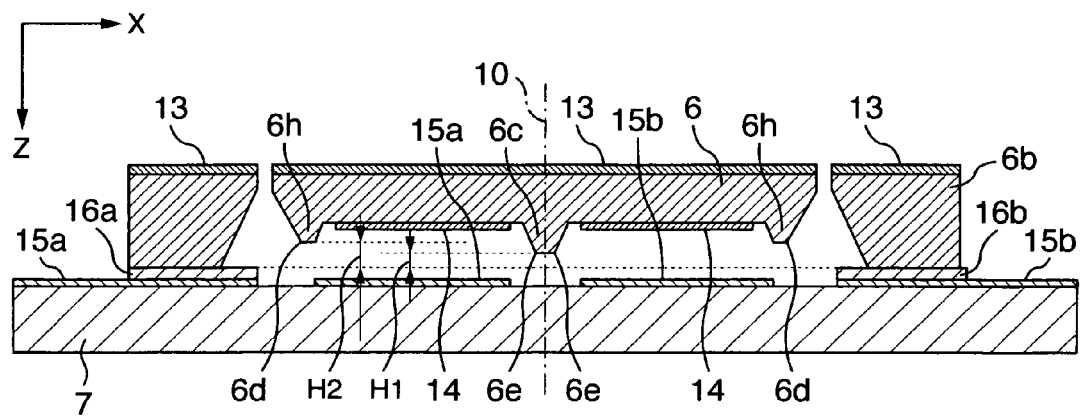
FIG. 8 is an X-Z sectional view showing structures of a movable mirror and a substrate opposed to the movable mirror taken along a line E-E shown in FIG. 7.

If a projection that comes in contact with the substrate 7 is provided near each of the mirror edges 6d as, for example, in the configuration shown in FIG. 8, it is possible to reduce the area of contact and avoid sticking between the movable mirror 6 and the substrate 7. The position of the projection is not restricted to the vicinity of the central portion of the rear face of the movable mirror or the vicinity of the mirror edge 6d, as long as the position is in the contact portion when the movable mirror 6 maintains the first position and the second position.

As a method for reducing the area of contact and avoiding the sticking between the movable mirror 6 and the substrate 7 while providing the movable mirror 6 with the first position and the second position, it is also possible to provide a projection on the substrate side. In other words, at least a part of the contact portions between the movable mirror 6 and the substrate 7 may be provided on the substrate 7. In addition, the movable mirror 6 may not have projections at all at this time. A contact portion between a projection and the movable mirror 6 is not restricted to the vicinity of the central portion of the rear face of the movable mirror or the vicinity of the mirror edge 6d, as long as the contact portion serves as a contact portion when the movable mirror 6 maintains the first position and the second position.

From the viewpoint of suppressing the sticking between the movable mirror 6 and the substrate 7, it is desirable to reduce the area of contact. It is desirable to cause the mirror edges on both sides of the movable mirror 6 having the rotation axis of the movable mirror between to come in contact with the substrate 7 as described above and in addition provide notches on the mirror edges. The area of contact can be reduced by providing notches, providing each of the mirror edges 6d on the rear face side of the movable mirror 6 with a shape having convex and concave portions, and using the convex portions as the contact portions. For example, rectangular notches may be provided in the center of the mirror edges to form an X-shape as shown in FIG. 7. As another example, a movable mirror 6 having a combination of semicircles as each of the mirror edges 6d is exemplified in FIG. 2B. FIG. 2B is an X-Y plane diagram showing a structure of the rear face side of the movable mirror 6 having a combination of semicircles as each of the mirror edges 6d. In the movable mirror 6 exemplified in FIG. 2B, a projection is formed on the opposed substrate 7 and projections are not formed on the movable mirror 6. As for the projection formed on the substrate 7, the projection is formed in a position having a contact point near the center of the rear face of the movable mirror 6 and projections are not formed near the mirror edges 6d. Therefore, contact points between the movable mirror 6 and the substrate 7 located near the mirror edges 6d become contact points between the plane of the substrate 7 and the vicinities of tops of the semicircles formed on the mirror edges 6d.

Second Embodiment

An optical switch array according to the present invention is an optical switch array (N arrays each having 1×2 optical switches) obtained by integrating N pieces of 1-input 2-output optical switches (1×2 optical switches). Each 1×2 optical switch includes an optical fiber array having one input optical fiber and two output optical fibers arranged on substantially the same plane, a collimator lens array having collimator lenses respectively associated with the input optical fiber and the output optical fibers, a movable mirror for switching over optical paths between the input optical fiber and the output optical fibers, and a cylindrical lens disposed between the collimator lenses and the movable mirror. In the optical switch array, at least two optical switches are arranged in the column axis direction of the cylindrical lens and integrated. In addition, the at least two optical switches share one cylindrical lens. Light beams emitted from the input optical fiber in each of the integrated 1×2 optical switches and collimated by an associated collimator lens are substantially parallel. And the at least two 1×2 optical switches arranged so as to cause planes on which optical fiber arrays in the 1×2 optical switches are arranged to become substantially parallel to each other share the cylindrical lens. As a result, downsizing and integration of the optical switch array becomes possible. Here, N is a natural number having a value of at least 2.

Figure 6:
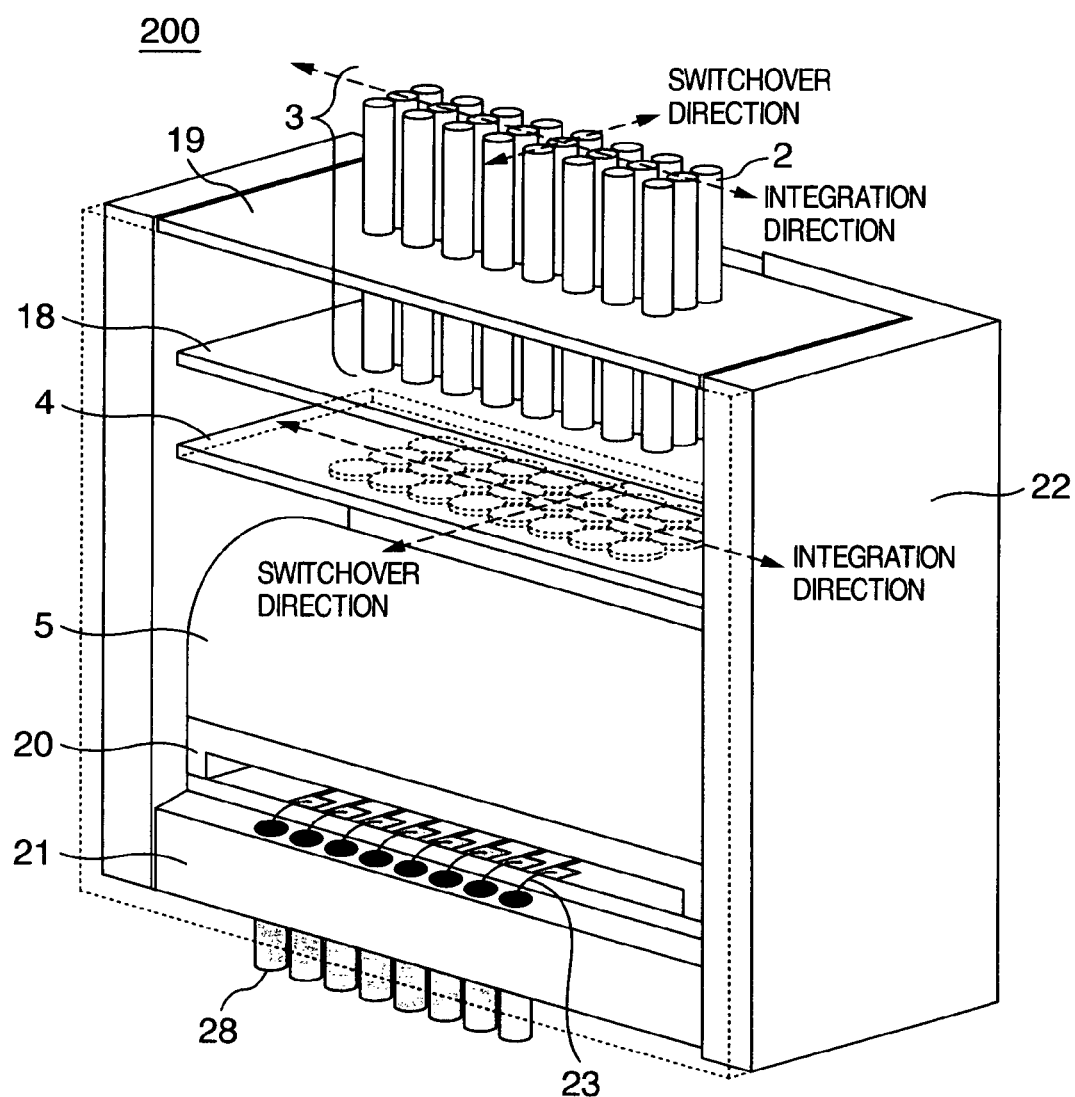
FIG. 6 is an oblique view showing a general structure of an embodiment of an optical switch array according to the present invention.

FIG. 6 shows an oblique view of a general structure of an eight-switch array (with N=8) having eight 1×2 optical switches as an example of the present invention.

In each of 1×2 optical switches included in the optical switch array according to the present invention, light emitted from the input optical fiber and collimated by a collimator lens associated with the input optical fiber is passed through the cylindrical lens, reflected by the movable mirror, passed through the cylindrical lens again, and condensed by a collimator lens associated with the output optical fiber to arrive at the output optical fiber associated with the collimator lens.

The movable mirror assumes a first position for forming an optical path between the input optical fiber and the first output optical fiber, and a second position for forming an optical path between the input optical fiber and the second output optical fiber. When the movable mirror assumes the first position, light emitted from the input optical fiber arrives at the first output fiber. When the movable mirror assumes the second position, light emitted from the input optical fiber arrives at the second output fiber. It is desirable to arrange the input and output optical fibers on nearly the same plane and cause the pitch (arrangement interval) of the collimator lenses associated with the input and output optical fibers to coincide with the pitch of the input and output optical fibers.

The arrangement order of the input and output optical fibers is not restricted. As for three optical fibers associated with the input and output optical fibers, it is possible to use the optical fiber located in the center as the input optical fiber and use optical fibers located at both ends as output optical fibers. On the other hand, it is also possible to use an optical fiber located on one end as the input optical fiber and use two remaining optical fibers as the output optical fibers.

The collimator lenses in each of 1×2 optical switches included in the optical switch array according to the present invention can be freely selected, as long as the collimator lenses have a function of collimating light emitted from the input optical fiber and condensing the collimated light to the output optical fiber. For example, the collimator lenses may be spherical lenses, aspherical lenses or Fresnel lenses. Or the collimator lenses may be convex lenses, concave lenses, or graded index lenses. As the material of the collimator lenses, a material that is not opaque at a wavelength of light in use, such as ordinary optical glass, silicon, quartz or resin, can be selected. Furthermore, it is desirable to form an antireflection film corresponding to the wavelength of light in use, on the obverse and the reverse of each of the collimator lenses.

The shape of the cylindrical lens in each of 1×2 optical switches included in the optical switch array according to the present invention can be freely selected, as long as the cylindrical lens has a function of deflecting light emitted from the input optical fiber, collimated by the associated collimator lens and propagated in a direction perpendicular to the optical axis of the input optical fiber to the movable mirror and deflecting light reflected by the movable mirror in a direction parallel to the optical axis of the output optical fiber. The cylindrical lens can be formed as a convex or a concave lens. Furthermore, the face of the cylindrical lens opposed to the optical fiber array 3 can be formed as a curved face or a flat face.

As the material of the cylindrical lens, a material that is not opaque at a wavelength of light in use, such as ordinary optical glass (for example, BK7), silicon, quartz or resin, can be suitably selected. Furthermore, it is desirable to form an antireflection film corresponding to the wavelength of light in use, on the obverse and the reverse of the cylindrical lens.

The shape of the movable mirror in each of 1×2 optical switches included in the optical switch array according to the present invention can be freely selected, as long as the movable mirror has the first position for forming an optical path between the input optical fiber and the first output optical fiber, and the second position for forming an optical path between the input optical fiber and the second output optical fiber. In the first position and the second position, it is not necessary that the movable mirror is in contact with the substrate opposed to the mirror. Because of the reason mentioned in the description of the first embodiment, however, it is desirable that the movable mirror has a contact portion to the substrate opposed to the mirror in the first position and the second position. If the movable mirror has a contact portion to the substrate opposed to the mirror in the first position and the second position, it is desirable to lower the surface energy in the contact portion and reduce the area of contact. If the movable mirror has a contact portion to the substrate opposed to the mirror in the first position and the second position, it is desirable that switching between the first position and the second position is conducted via a state in which the movable mirror is not in contact with the substrate opposed to the movable mirror. The movable mirror can be brought into operation by applying one or more of various actuators such as an electrostatic actuator, an electromagnetic actuator, a piezoelectric actuator and a thermal actuator.

The N-array having N pieces of 1×2 optical switches will now be described. It is desirable that 1×2 optical switches included in the N-array having 1×2 optical switches can be brought into operation independently each other. Here, independent operations of the optical switches mean that the output destination of the input light in a certain optical switch can be selected regardless of other optical switches.

When integrating N pieces of 1×2 optical switches in the optical switch array according to the present invention, at least two 1×2 optical switches, preferably N pieces of 1×2 optical switches share one cylindrical lens. It is desirable in the optical switch array according to the present invention that N pieces of 1×2 optical switches share one cylindrical lens. It is also possible to adopt a structure in which N pieces of 1×2 optical switches are divided into a first partial element of N1 pieces of optical switches and a second partial element of N2 pieces of optical switches, the N1 pieces of optical switches in the first partial element share one cylindrical lens, and the N2 pieces of optical switches in the second partial element share another cylindrical lens. At this time, the relation N1+N2=N is satisfied, and at least one of N1 and N2 is a natural number having a value of at least 2, and the remaining one is a natural number having a value of at least 1. The number of divisions is not restricted to the division into two parts as in N1 and N2. For example, it is also possible to divide N pieces of 1×2 optical switches into partial elements respectively having N1, N2 and N3 pieces of optical switches, where N1+N2+N3=N. In this case, at least two 1×2 optical switches share one cylindrical lens in at least one partial element among the partial elements in the same way as the example of the division into two parts.

In the optical switch array according to the present invention, a plurality of 1×2 optical switches share one cylindrical lens. As a result, the number of components can be reduced, and the optical switch array can be assembled using simple blanket assembly. At the same time, barriers and spaces between 1×2 optical switches can be made unnecessary or can be reduced as compared with the case where 1×2 optical switches are independent. As a result, a small-sized optical switch array can be implemented. Each of the 1×2 optical switches included in the optical switch array according to the present invention may have any structure. It is desirable to integrate 1×2 optical switches having the structure described with reference to the first embodiment.

When integrating N pieces of 1×2 optical switches in the optical switch array according to the present invention, it is desirable to form one optical fiber array having 3N pieces of optical fibers by forming N optical fiber arrays each having three optical fibers with respect to one common member. By using the present configuration, it becomes possible to simplify the fabrication of the optical fiber array and the assembly process of the optical switch array. As for the common member for forming the optical fiber array, for example, a substrate (optical fiber aligning substrate) provided with through holes having a pitch corresponding to that of the desired optical fiber array can be used. An optical fiber array can be implemented by inserting a part of optical fibers into holes of the substrate. As the material of the substrate, selection can be made suitably from silicon, ceramics, resin, various kinds of glass and various kinds of metal.

When integrating N pieces of 1×2 optical switches in the optical switch array according to the present invention, it is desirable to form one collimator lens array having 3N pieces of collimator lenses by forming N pieces of collimator lens arrays each having three collimator lenses with respect to one common member. By using the present configuration, blanket formation of the collimator lens array becomes possible and the assembly process of the optical switch array can be simplified. As the material of the collimator lens array, a material that is not opaque at a wavelength of light in use, such as silicon, various kinds of optical glass, or resin, can be suitably selected. It is desirable to form an antireflection film corresponding to the wavelength of light in use, on the obverse and the reverse of each of the collimator lenses. As for the fabrication method of the collimator lenses, a method of forming the collimator lenses by using a resin mold or glass mold can be applied, besides a method according to a kind of cutting using photolithography and etching.

When integrating N pieces of 1×2 optical switches in the optical switch array according to the present invention, it is desirable to fabricate a total of N pieces of mirrors each included in every 1×2 optical switch by using one member, preferably in a blanket process and form a mirror array having N pieces of mirrors. By using the present configuration, simplification in fabrication of N pieces of mirrors and assembly of the optical switch array becomes possible. As a method for fabricating the mirror array, a method of using photolithography and etching can be applied.

A concrete structure of the optical switch array according to the present invention will now be described with reference to FIG. 6. An optical switch array 200 in the present second embodiment includes an optical fiber array 3, a collimator lens array 4, a cylindrical lens 5, a mirror array 208 (see FIGS. 7 and 9), a cabinet base 22 and an inclined spacer 20 as components. The optical switch array 200 shown in FIG. 6 is an optical switch array obtained by integrating eight 1×2 optical switches operating independently. However, the number of 1×2 optical switches that can be integrated is not restricted to the number in the example shown in FIG. 6.

In the present second embodiment, the optical fiber array 3 includes twenty-four optical fibers 2, and substrates (optical fiber aligning substrates) 18 and 19 for aligning these fibers, as components. Each of the optical fiber aligning substrates 18 and 19 has through holes for leading and aligning the optical fibers 3 as described in detail later. In the present second embodiment eight 1×2 optical switches are integrated. As for twenty-four optical fibers 2, three optical fibers are arranged in a first direction, and eight optical fibers are arranged in a direction perpendicular to the first direction. Here, the three arranged optical fibers correspond to one input optical fiber and two output optical fibers that are associated with one 1×2 optical switch. This arrangement direction is defined as switching direction. An arrangement direction perpendicular to the switching direction is defined as integration direction. (Definitions of the switching direction and the integration direction are shown in FIG. 6.) In the present second embodiment, the optical fiber pitch in the switching direction is set equal to 0.5 mm and the optical fiber pitch in the integration direction is set equal to 1 mm.

In the optical fiber array 3, optical fibers are aligned with high precision. In the present second embodiment, optical fibers are aligned using the optical fiber aligning substrate 18 having optical fiber aligning holes formed through it. The alignment precision of the optical fiber array 3 is given by the precision of through holes formed through the optical fiber aligning substrate 18 to align the optical fibers.

Hereafter, the optical fiber aligning substrate 18 in the present second embodiment will be described in detail. In the optical fiber array 3, it is necessary to align optical fibers with high precision. In the present second embodiment, the optical fiber aligning substrate is formed using a silicon substrate and the MEMS technique. The optical fiber aligning substrate is fabricated using the photolithography technique and the etching technique as the MEMS technique.

However, the material of the optical fiber aligning substrate is not restricted to silicon, but selection can be made from quartz, various kinds of glass, ceramics and metal. Furthermore, the working method of the optical fiber aligning substrate is not restricted to the photolithography technique and the etching technique, but various kinds of mechanical working and laser working can also be used.

Figure 10A:
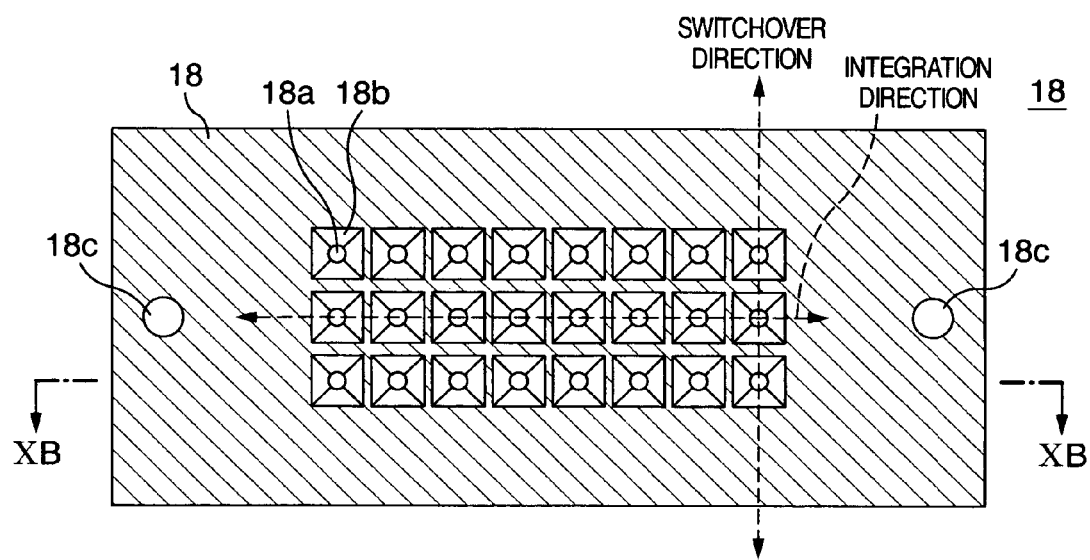
FIG. 10A is a plan view showing an example of a structure of an optical fiber aligning substrate in a second embodiment.
Figure 10B:
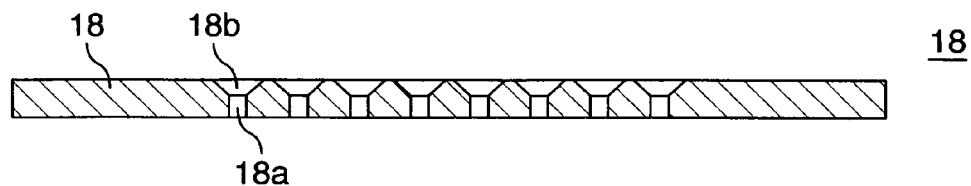
FIG. 10B is a sectional view showing a structure of an optical fiber aligning substrate taken along a line XB-XB shown in FIG. 10A.

FIG. 10A is plane view showing an example of a structure of the optical fiber array aligning substrate 18 in the present second embodiment. FIG. 10B is a sectional view showing the structure of the optical fiber array aligning substrate 18 taken along a line XB-XB shown in FIG. 10A.

Through holes (optical fiber aligning holes) 18a for aligning optical fibers and through holes (positioning holes) 18c for positioning are formed through the optical fiber aligning substrate 18 by using etching processing. As many optical fiber aligning holes 18a as the number of the input and output optical fibers in use are formed. In the present embodiment, twenty-four optical fiber aligning holes 18a are formed.

Each of the optical fiber aligning holes has a diameter larger than the diameter of the core of optical fiber even in the minimum opening portion of the optical fiber aligning hole. It is desirable that each of the optical fiber aligning holes has a maximum opening of the optical fiber aligning hole in at least one of opening portions. In addition, it is desirable that the optical fiber aligning hole has the maximum opening in an opening portion on the side remote from the cylindrical lens.

In the optical fiber aligning substrate shown in FIGS. 10A and 10B as an example, anisotropic etching using an etchant such as KOH is conducted from one side of the silicon substrate. As a result, each of optical fiber aligning holes 18a partially has a quadrangular pyramid shape. Dry etching is conducted from the other side of the silicon substrate. As a result, each of the optical fiber aligning holes 18a partially has a column shape. The quadrangular pyramid shape portion 18b serves as a guide when inserting an optical fiber. The fabrication method of the optical fiber aligning holes is not restricted to the above-described method. For example, a structure and a manufacturing method in which anisotropic etching using an etchant such as KOH is conducted from both sides and a minimum opening is formed in the fiber aligning central portion may also be used. In the optical fiber array, two optical fiber aligning substrates may also be used.

The present embodiment is an example of integration of eight 1×2 optical switches. Therefore, the collimator lens array 4 has three collimator lenses in the switching direction and eight collimator lenses in the integration direction. In other words, the collimator lens array 4 has a total of twenty-four collimator lenses as its components. Here, definitions of the switching direction and the integration direction conform to the directions defined with reference to the optical fiber array 3. The pitch of the collimator lens array 4 corresponds to the pitch of the optical fiber array 3. In the present embodiment, the pitch of the collimator lens array in the switching direction is set to 0.5 mm and the pitch of the collimator lens array in the integration direction is set to 1 mm.

In the present embodiment, the collimator lens array 4 is fabricated by conducting etching on a silicon substrate having a substrate thickness of 0.625 mm. An antireflection film corresponding to the wavelength (in the range of 1500 to 1650 nm) of light in use is formed on the obverse and the reverse of the collimator lens array 4. The collimator lens array 4 has a structure having a flat plane on the side opposed to the optical fiber array 3 and having convex lenses on the side opposed to the cylindrical lens 5. Each of the collimator lenses included in the collimator lens array 4 has a spherical convex lens that is 0.45 mm in lens diameter and 3 mm in radius of curvature. As a different mode of the optical switch array, the optical switch array may be formed by using a collimator lens array formed of aspherical lens made of silicon each having a lens pitch of 0.5 mm, a plate thickness of 0.5 mm, a lens diameter of 0.25 mm and a focal length of 1.5 mm.

Figure 11:
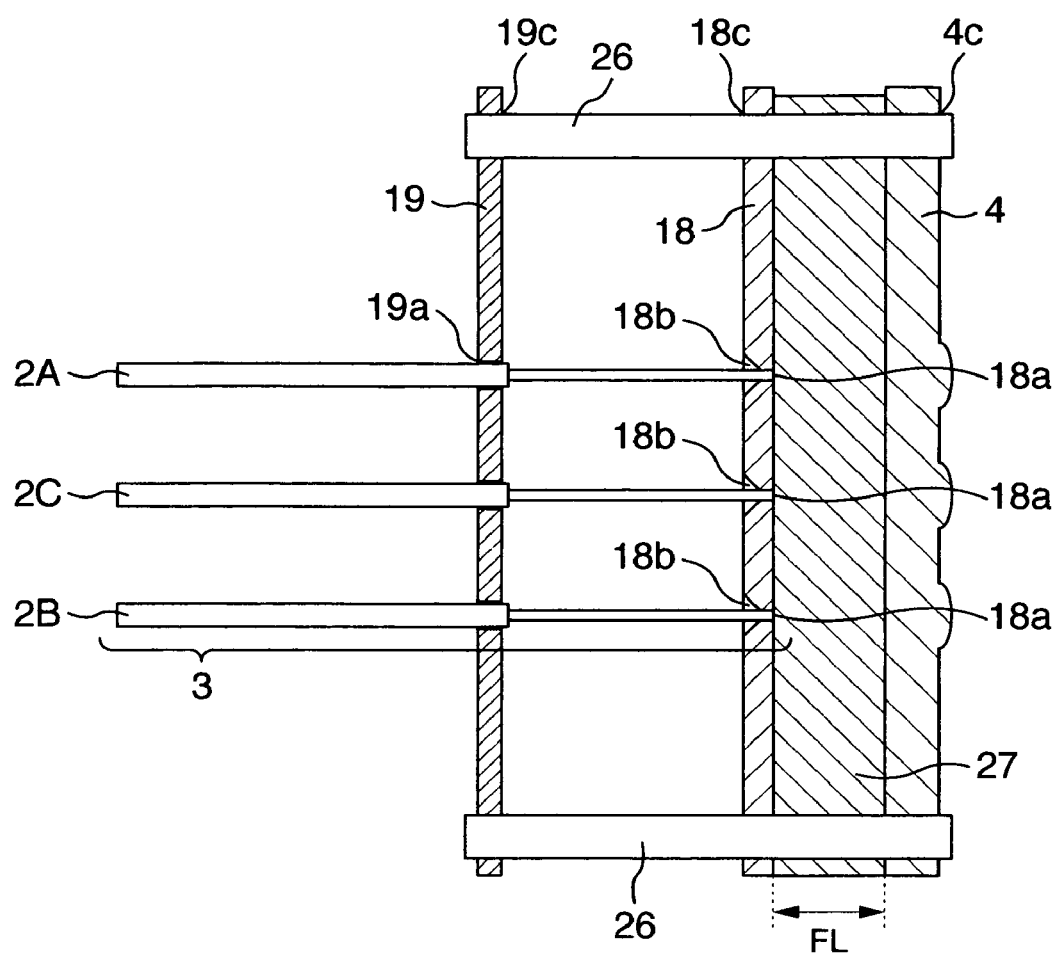
FIG. 11 is a sectional view showing an example of an assembly structure of an optical fiber aligning substrate and a collimator lens array that can be applied to an optical switch array in a second embodiment.
Figure 12:
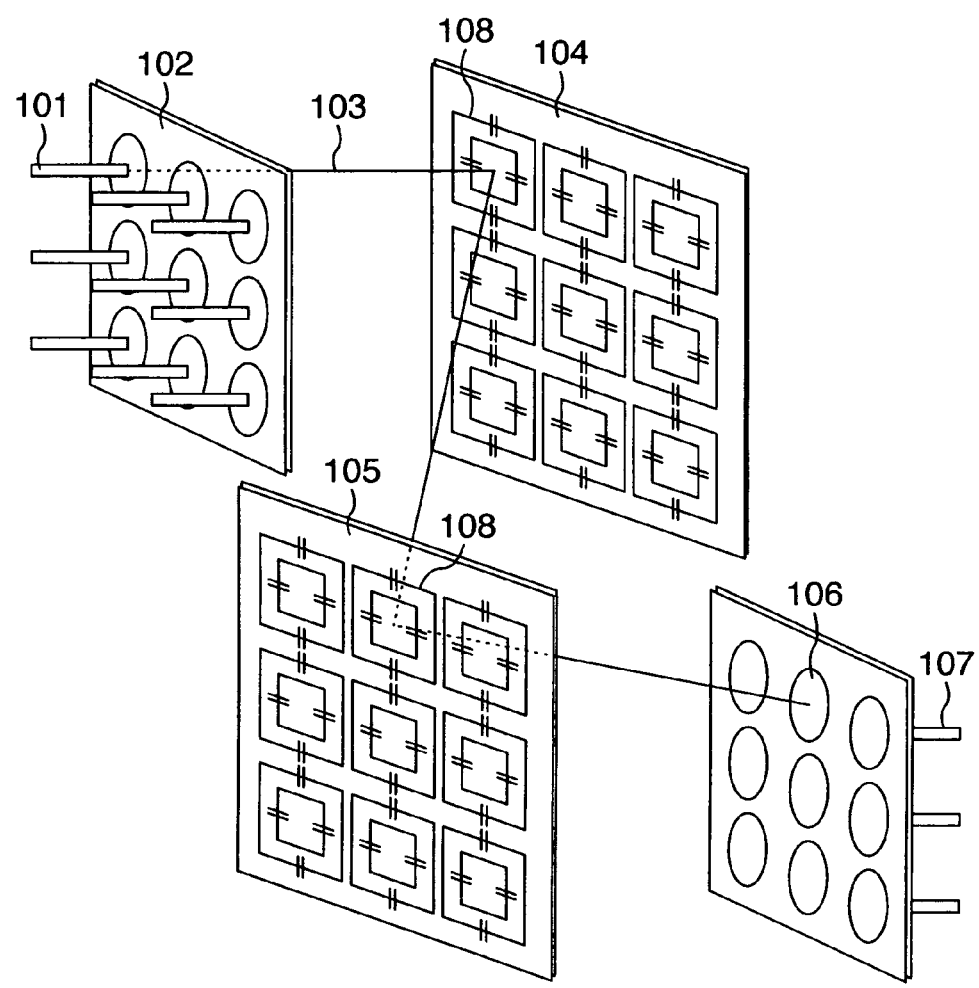
FIG. 12 is an oblique view showing an example of a structure of a conventional optical switch.
Figure 13A:
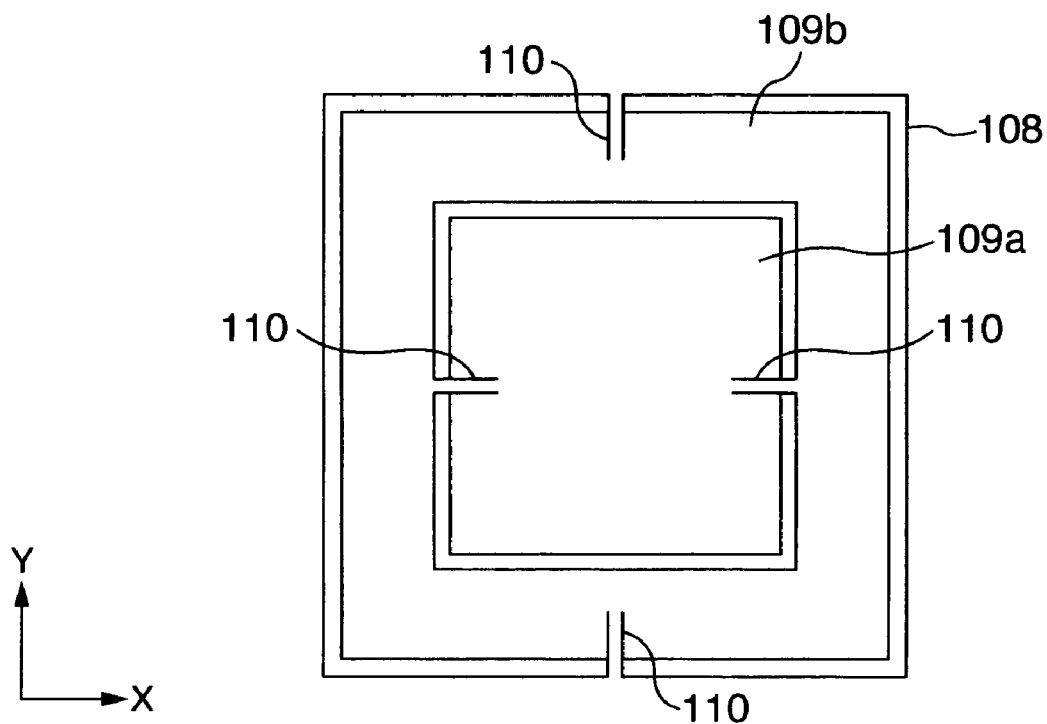
FIG. 13A is an X-Y plane view showing a structure of a mirror device shown in FIG. 12.
Figure 13B:
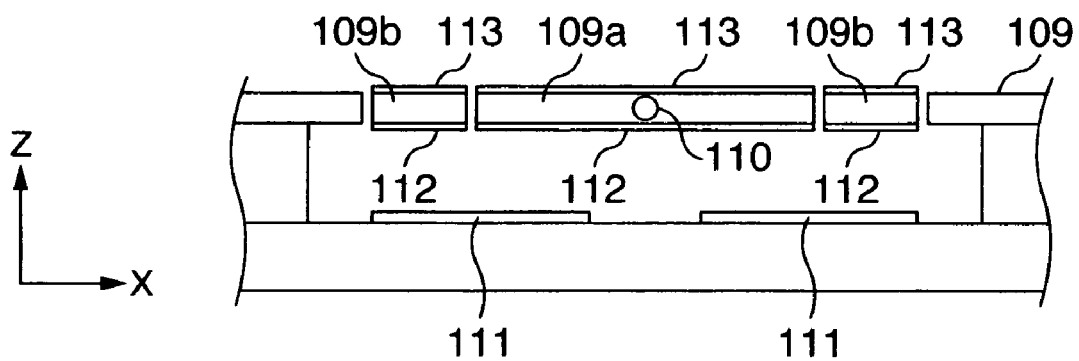
FIG. 13B is an X-Z sectional view showing a structure of a mirror device.

FIG. 11 is a sectional view showing an example of an assembly structure of the optical fiber aligning substrates 18 and 19 and the collimator lens array 4 that can be applied to the optical switch array 3 in the present embodiment.

Positioning holes 18c, 19c and 4c are formed through the optical fiber aligning substrates 18 and 19 and the collimator lens array 4, respectively. The optical fiber aligning substrates 18 and 19 and the collimator lens array 4 are positioned by inserting positioning pins 26 into the positioning holes.

The optical fiber array 3 is fabricated by passing optical fibers through optical fiber aligning holes 19a of the optical fiber aligning substrate 19 from the left of FIG. 11 and inserting tips of the optical fibers into optical fiber aligning holes 18a of the optical fiber aligning substrate 18. In a state in which the optical fiber aligning substrates 18 and 19 and the collimator lens array 4 are positioned using the positioning pins 26, the optical fiber array 3 is fabricated. The optical fiber array 3 may be fabricated in a state in which only the optical fiber aligning substrates 18 and 19 are positioned using the positioning pins 26. The optical fiber is fixed to the optical fiber aligning substrate by using fixing means such as a binding material or solder.

In the present embodiment, the optical fiber aligning substrates 18 and 19 and the collimator lens array 4 are made of silicon. Therefore, it is desirable to make the positioning pins 26 of a material that is close to silicon in coefficient of linear expansion. In the present embodiment, the positioning pins 26 are made of kovar. As the material of the positioning pins 26, an alloy such as silicon, 42-alloy or invar can also be selected.

A gap between the optical fiber aligning substrate 18 and the collimator lens array 4 is selected so as to cause light emitted from the input optical fiber to become a collimated beam having desired characteristics. At this time, the gap may be an air gap. Or it is possible to adopt a structure in which a material that is not opaque to the wavelength of light in use, such as resin, oil, silicon, quartz or various kinds of glass, is inserted into the gap. In the case of the structure in which silicon, quartz or various kinds of glass is inserted into the gap, it is desirable to utilize the inserted member, such as silicon, quartz or various kinds of glass, as a member (stopper) for aligning the input and output optical fiber end positions. In the case of the structure in which silicon, quartz or various kinds of glass is inserted into the gap, it is desirable to define a space between the optical fiber array 3 and the collimator lens array 4 by using the inserted member such as silicon, quartz or various kinds of glass. In the present embodiment, the gap is formed as an air gap, and a space FL between the optical fiber array 3 and the collimator lens array 4 is set equal to 1.08 mm. The space FL between the optical fiber array 3 and the collimator lens array 4 is shown in FIG. 11.

In the present embodiment, eight 1×2 optical switches share one cylindrical lens 5. The cylindrical lens 5 is made of optical glass (BK7). The cylindrical lens 5 has a radius of curvature of 3.58 mm and a focal length of 7.15 mm. An antireflection film corresponding to the wavelength (in the range of 1,500 to 1650 nm) of light in use is formed on each of the obverse and reverse of the cylindrical lens 5. The cylindrical lens 5 is disposed to have its curved face opposed to the collimator lens array 4 and have its flat plane side opposed to the mirror array 208.

Figure 9:
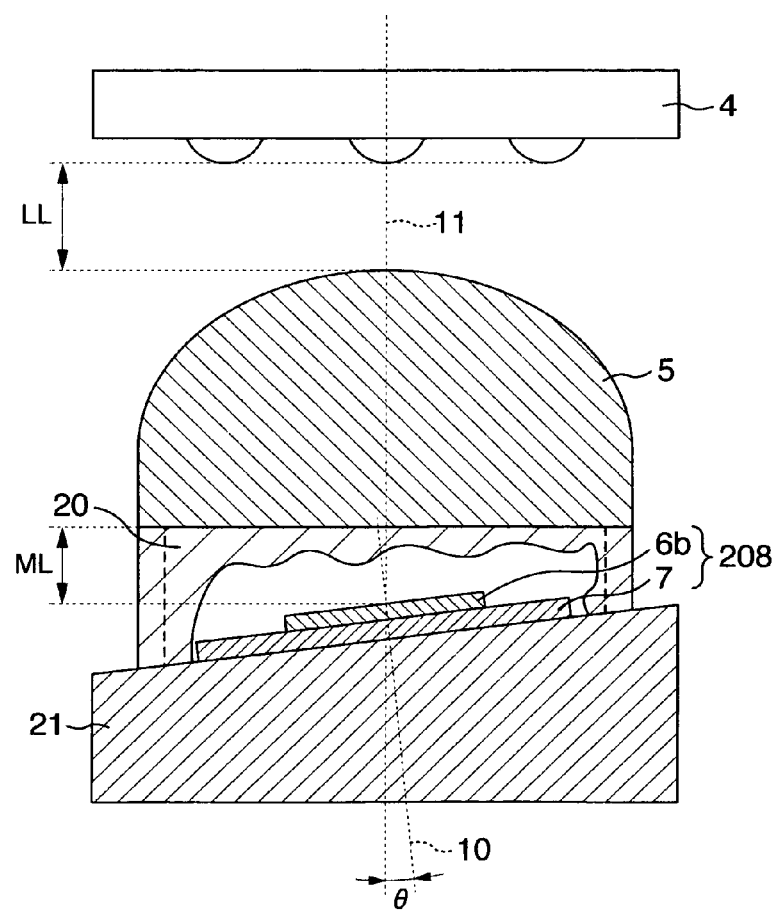
FIG. 9 is a sectional view showing an example of a structure for assembling a cylindrical lens and a mirror array by using an inclined spacer.

In the present embodiment, a space LL between the collimator lens array 4 and the cylindrical lens 5 is set in the range of 7 to 10 mm. The space LL between the collimator lens array 4 and the cylindrical lens 5 is shown in FIG. 9. The cylindrical lens included in the present embodiment is not restricted to the above-described cylindrical lens. As another mode of the optical switch array according to the present invention, the optical switch array may be constructed by using a cylindrical lens made of quartz glass that is 3.25 mm in radius of curvature of lens face and 6.4 mm in focal length.

In the present embodiment, eight 1×2 optical switches are integrated. Therefore, the mirror array 208 includes eight movable mirrors 6. Each movable mirror 6 is a movable mirror driven by an electrostatic actuator. Each movable mirror 6 has a structure that can rotate in a direction with a rotation axis taken in the arrangement direction of the movable mirrors. The arrangement direction of the movable mirrors is a direction corresponding to the integration direction of the optical fiber array 3 and the collimator lens array 4. In the mirror array 208, therefore, the movable mirrors 6 are arranged in a row with a pitch corresponding to the pitch of the optical fiber array 3 in the integration direction. In the present embodiment, the pitch of the movable mirrors 6 is set equal to 1 mm. A space ML between the cylindrical lens 5 and the mirror array 208 is set equal to 5.11 mm. The space ML between the cylindrical lens 5 and the mirror array 208 is shown in FIG. 9.

FIG. 7 is an X-Y plane view showing a structure of the reflecting face side of the movable mirrors 6 in the present embodiment. FIG. 8 is an X-Z section view showing a structure of the movable mirror 6 and the substrate 7 opposed to the movable mirror taken along a line VIII-VIII shown in FIG. 7.

Each of the movable mirrors 6 is supported by a pair of beams 6a serving as elastic members. The beams 6a are coupled to the substrate (movable mirror substrate) 6b in which the movable mirrors 6 are formed.

The beams 6a are beams each extending in the X-axis direction and having a folded structure so as to facilitate the rotational and translational movement, i.e., sinking of the movable mirror 6 in the Z-direction. However, the structure of the beams 6a is not restricted to the present structure.

In the present embodiment, each of the movable mirrors 6 is provided with an X-shape, and the area of contact between mirror edges located on both sides of the movable mirror having the rotation axis of the rear face of the movable mirror between and the substrate 7 is reduced. The projection 6c is formed near the center of the rear face of the movable mirror 6. Two projections 6h (FIG. 8) are formed on each of the mirror edges 6d. Thus, a total of four projections 6h are formed every movable mirror. In the present embodiment, the movable mirrors are formed using the silicon substrate as the material. Each of the projections 6c and the projections 6h is provided with a trapezoidal shape by forming it using anisotropic etching using an etchant such as KOH. Since the manufacturing method of the movable mirrors is the same as that of the movable mirror described with reference to the first embodiment, description thereof will be omitted.

Electrodes 15a and 15b for driving the movable mirrors 6 are formed on the substrate 7 opposed to the movable mirrors 6.

The projection 6c has a predetermined gap H1 from a bottom face of the movable mirror substrate 6b. The projections 6h have a predetermined gap H2 from the bottom face of the movable mirror substrate 6b. If the relation H2>H1 is satisfied, the mirror can be inclined in the state in which the projection 6c and one of the projections 6h are in contact with the substrate 7. Thus, the movable mirror 6 is provided with the first position and the second position. With reference to an position of the movable mirror 6 obtained when drive force is not applied to the movable mirror 6, an angle (first angle) of the movable mirror in the first position is set to +1 degree and an angle (second angle) of the movable mirror in the second position is set to −1 degree. In order to implement the above-described angles, the difference between H2 and H1 is set equal to 15 μm, and the distance between a ridgeline located on the projection 6h side of the projection 6c and a ridgeline of the projection 6h located at a greater distance from the projection 6c is set equal to 859 μm.

Light emitted from the input optical fiber and collimated by the associated collimator lens assumes a pseudo elliptical shape that is long in the arrangement direction of the movable mirrors, at the reflection surface of the movable mirror as a result of the action of the cylindrical lens 5. At this time, the diameter of light is in the range of 0.2 to 0.25 mm in the major axis direction and is in the range of 0.1 to 0.15 mm in the minor axis direction. Therefore, 0.45 mm×0.3 mm is secured as the reflection surface of the mirror.

Input and output optical fibers in each of 1×2 optical switches in the present embodiment are arranged in the order of the input optical fiber, the first output optical fiber and the second optical fiber. Components of the optical switch array (the optical fiber array 3, the collimator lens array 4, the mirror array 208 and the cylindrical lens 5) are arranged so as to cause light emitted from the input optical fiber to arrive at the first output optical fiber when the movable mirror 6 assumes the first position and cause light emitted from the input optical fiber to arrive at the second output optical fiber when the movable mirror 6 assumes the second position.

Elements of the optical fiber array 3, the collimator lens array 4, the cylindrical lens 5 and the mirror array 208 are joined to a common reference member (cabinet base 22) directly or indirectly via an intermediate member to hold relative positions between members. FIG. 6 shows an example of a structure in which the optical fiber array 3, the collimator lens array 4, the cylindrical lens 5 and the mirror array 208 are assembled in the cabinet base 22. Various kinds of material can be used for the cabinet base 22. It is desirable to square the cabinet base 22 with various components of the optical switch array 200 in coefficient of linear expansion. In the present embodiment, the movable mirror 6 and the optical fiber aligning substrate 18 are made of silicon. As the material of the cabinet base 22, therefore, it is desirable to use silicon or various kinds of alloy that are close to silicon in coefficient of linear expansion, such as kovar, 42-alloy, invar, ceramics, or glass.

FIG. 9 is a sectional view showing an example of a structure in which the cylindrical lens 5 and the mirror array 208 are assembled using the inclined spacer 20.

In the present embodiment, the inclined spacer 20 causes the face of the mirror array to be unparallel to the face of the cylindrical lens in order to cause light emitted from the input optical fiber to arrive at the first output optical fiber when the movable mirror 6 assumes the first position and cause light emitted from the input optical fiber to arrive at the second output optical fiber when the movable mirror 6 assumes the second position. However, the present shape is an example of the shape of the inclined spacer 20. The inclined spacer 20 may assume any shape, as long as the components of the optical switch array 200 has a function of implementing an arrangement in which light emitted from the input optical fiber arrives at the first output optical fiber when the movable mirror 6 assumes the first position and light emitted from the input optical fiber arrives at the second output optical fiber when the movable mirror 6 assumes the second position. Or the inclined spacer 20 may not be used by causing the cabinet base 22 to have the function. If the inclined spacer 20 is used, it is desirable to fabricate the inclined spacer of the same material as that of the cabinet base or a material having a coefficient of linear expansion close to that of the cabinet base.

Electrode terminals are formed on a base substrate 21 shown in FIG. 6 or FIG. 9. Drive force is given to the movable mirror 6 by electrically connecting the electrode terminals to the movable mirror 6 or the substrate 7 using wire bonding.

For example, the terminals on the base substrate 21 are connected to the electrodes 15 on the substrate 7 by bonding wires 23.

Since connectors 28 for power supply can be installed on the opposite side from the input and output optical fibers 2, 5 small-sized optical switches that can be mounted at high density can be provided.

If the base substrate 21 is used, it is desirable to fabricate the base substrate 21 by using the same material as that of the substrate 7 or a material that is close to the substrate 7 in coefficient of linear expansion.

In the optical switch array 200 in the present embodiment, a plurality of switch elements share one cylindrical lens. As a result, it is possible to reduce the number of components and simplify the assembly of the optical switch array 200. At the same time, barriers between the 1×2 optical switches become unnecessary as compared with the case where the 1×2 optical switches are independent. As 20, compared with the case where the 1×2 optical switches are simply integrated, the size of the optical switch array can be made small.

By forming the optical fiber arrays 3 belonging to 1×2 optical switches with respect to one common member, simplification in the fabrication of the optical fiber arrays 3 and assembly of the optical switch array 200 becomes possible. In addition, by integrating the movable mirrors belonging to the 1×2 optical switches on a common member, simplification in the fabrication of a plurality of movable mirrors and assembly of the optical switch array becomes possible.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical switch comprising:
   an optical fiber array formed by arranging one input optical fiber, a first output optical fiber and a second output optical fiber;
   a rotatable movable mirror for switching over optical paths between the input optical fiber and the output optical fibers; and
   a collimator lens array having three collimator lenses respectively associated with the input optical fiber and the two output optical fibers, the collimator lens array being disposed between the optical fiber array and the movable mirror,
   wherein
   the input optical fiber and the output optical fibers are aligned and arranged on substantially the same plane in order of the input optical fiber, the first output optical fiber and the second output optical fiber,
   the movable mirror has a first position for forming an optical path between the input optical fiber and the first output optical fiber, and a second position for forming an optical path between the input optical fiber and the second output optical fiber,
   the first position and the second position are formed by applying drive force to the movable mirror,
   when drive force is not applied to the movable mirror, an optical path is formed between the optical path formed in the first position and the optical path formed in the second position,
   the movable mirror is connected to a stationary member via elastic members formed integrally with the movable mirror,
   the first position is assumed by the movable mirror in contact with a substrate disposed so as to be opposed to the movable mirror, at a plurality of contact portions, and
   the second position is assumed by the movable mirror in contact with the substrate at a plurality of contact portions differing in at least a part from the contact portions forming the first position.

2. An optical switch according to claim 1, wherein at least a part of the contact portions between the movable mirror and the substrate is a projection provided on a rear face of the movable mirror.

3. An optical switch according to claim 1, wherein at least a part of the contact portions between the movable mirror and the substrate is a projection provided on the substrate.

4. An optical switch according to claim 1, wherein
   at least a part of the contact portions comprises edges located on both sides of the movable mirror having a rotation axis of the movable mirror between, and
   notches are provided on the edges.

5. An optical switch according to claim 1, wherein a cylindrical lens is disposed between the collimator lenses and the movable mirror.

6. An optical switch according to claim 1, wherein switching between the first position and the second position is conducted via a non-contact state between the substrate and the movable mirror.

7. An optical switch according to claim 6, wherein at least a part of the contact portions between the movable mirror and the substrate is a projection provided on a rear face of the movable mirror.

8. An optical switch according to claim 6, wherein at least a part of the contact portions between the movable mirror and the substrate is a projection provided on the substrate.

9. An optical switch according to claim 6, wherein
   at least a part of the contact portions comprises edges located on both sides of the movable mirror having a rotation axis of the movable mirror between, and
   notches are provided on the edges.

10. An optical switch according to claim 6, wherein a cylindrical lens is disposed between the collimator lenses and the movable mirror.

11. An optical switch according to claim 7, wherein a cylindrical lens is disposed between the collimator lenses and the movable mirror.

12. An optical switch according to claim 8, wherein a cylindrical lens is disposed between the collimator lenses and the movable mirror.

13. An optical switch according to claim 9, wherein a cylindrical lens is disposed between the collimator lenses and the movable mirror.

14. An optical switch array obtained by integrating at least two optical switches according to claim 5, wherein
   the at least two optical switches are arranged and integrated in a column axis direction of the cylindrical lens, and
   the at least two optical switches share the one cylindrical lens.

* * * * *